United States Patent
Davis et al.

(10) Patent No.: US 9,876,735 B2
(45) Date of Patent: Jan. 23, 2018

(54) PERFORMANCE AND POWER OPTIMIZED COMPUTER SYSTEM ARCHITECTURES AND METHODS LEVERAGING POWER OPTIMIZED TREE FABRIC INTERCONNECT

(75) Inventors: Mark Davis, Austin, TX (US); David Borland, Austin, TX (US)

(73) Assignee: III Holdings 2, LLC, Wilmington, DE (US)

( * ) Notice: Subject to any disclaimer, the term of this patent is extended or adjusted under 35 U.S.C. 154(b) by 682 days.

(21) Appl. No.: 13/234,054

(22) Filed: Sep. 15, 2011

(65) Prior Publication Data

US 2012/0096211 A1 Apr. 19, 2012
US 2015/0381528 A9 Dec. 31, 2015

Related U.S. Application Data

(63) Continuation-in-part of application No. 12/794,996, filed on Jun. 7, 2010, now abandoned.
(Continued)

(51) Int. Cl.
*H04L 12/933* (2013.01)
*H04L 12/931* (2013.01)
(Continued)

(52) U.S. Cl.
CPC .......... *H04L 49/10* (2013.01); *G06F 13/4282* (2013.01); *H04L 47/125* (2013.01);
(Continued)

(58) Field of Classification Search
CPC ......... H04L 12/10; H04L 12/56; H04L 12/26; G01R 31/08; G06F 1/20; G06F 1/26; G06F 1/32; G06F 12/00; G06F 15/16; G06F 13/28; G06F 13/00; G06F 13/38; G06F 15/173; H05K 7/14; H05K 7/18; H05K 7/20
(Continued)

(56) References Cited

U.S. PATENT DOCUMENTS 5,451,936 A 9/1995 Yang et al.
5,594,908 A * 1/1997 Hyatt .............................. 710/67
(Continued)

FOREIGN PATENT DOCUMENTS

JP 2005-223753 8/2005
JP 2005-536960 12/2005
(Continued)

OTHER PUBLICATIONS

Advanced Switching Technology Tech Brief, published 2005, 2 pages.
(Continued)

*Primary Examiner* — Charles C Jiang
*Assistant Examiner* — Kyaw Z Soe

(57) ABSTRACT

A performance and power optimized computer system architecture and method leveraging power optimized tree fabric interconnect are disclosed. One embodiment builds low power server clusters leveraging the fabric with tiled building blocks while another embodiment implements storage solutions or cooling solutions. Yet another embodiment uses the fabric to switch non-Ethernet packets, switch multiple protocols for network processors and other devices.

25 Claims, 30 Drawing Sheets

Related U.S. Application Data

(60) Provisional application No. 61/383,585, filed on Sep. 16, 2010, provisional application No. 61/256,723, filed on Oct. 30, 2009.

(51) Int. Cl.
*H04L 12/803* (2013.01)
*G06F 13/42* (2006.01)

(52) U.S. Cl.
CPC .......... *H04L 49/101* (2013.01); *H04L 49/351* (2013.01); *H04L 49/40* (2013.01); *Y02B 60/1228* (2013.01); *Y02B 60/1235* (2013.01)

(58) Field of Classification Search
USPC ......... 709/100, 305, 314, 103; 713/300, 324
See application file for complete search history.

(56) References Cited

U.S. PATENT DOCUMENTS

| | | | |
|---|---|---|---|
| 5,623,641 A | 4/1997 | Kadoyashiki | |
| 5,781,187 A | 7/1998 | Gephardt et al. | |
| 5,901,048 A | 5/1999 | Hu | |
| 5,908,468 A | 6/1999 | Hartmann | |
| 5,968,176 A | 10/1999 | Nessett et al. | |
| 5,971,804 A | 10/1999 | Gallagher et al. | |
| 6,055,618 A | 4/2000 | Thorson | |
| 6,141,214 A * | 10/2000 | Ahn | 361/679.48 |
| 6,181,699 B1 | 1/2001 | Crinion et al. | |
| 6,192,414 B1 | 2/2001 | Horn | |
| 6,198,741 B1 | 3/2001 | Yoshizawa et al. | |
| 6,314,487 B1 | 11/2001 | Hahn et al. | |
| 6,314,501 B1 | 11/2001 | Gulick et al. | |
| 6,373,841 B1 | 4/2002 | Goh et al. | |
| 6,442,137 B1 | 8/2002 | Yu | |
| 6,446,192 B1 | 9/2002 | Narasimhan et al. | |
| 6,452,809 B1 | 9/2002 | Jackson et al. | |
| 6,507,586 B1 | 1/2003 | Satran et al. | |
| 6,556,952 B1 | 4/2003 | Magro | |
| 6,574,238 B1 | 6/2003 | Thrysoe | |
| 6,661,671 B1 | 12/2003 | Franke et al. | |
| 6,711,691 B1 | 3/2004 | Howard et al. | |
| 6,766,389 B2 | 7/2004 | Hayter et al. | |
| 6,813,676 B1 * | 11/2004 | Henry et al. | 710/316 |
| 6,816,750 B1 | 11/2004 | Klaas | |
| 6,842,430 B1 | 1/2005 | Melnik | |
| 6,857,026 B1 | 2/2005 | Cain | |
| 6,963,926 B1 | 11/2005 | Robinson | |
| 6,963,948 B1 | 11/2005 | Gulick | |
| 6,977,939 B2 | 12/2005 | Joy et al. | |
| 6,988,170 B2 | 1/2006 | Barroso et al. | |
| 6,990,063 B1 | 1/2006 | Lenoski et al. | |
| 7,020,695 B1 | 3/2006 | Kundu et al. | |
| 7,032,119 B2 | 4/2006 | Fung | |
| 7,080,078 B1 | 7/2006 | Slaughter et al. | |
| 7,080,283 B1 | 7/2006 | Songer et al. | |
| 7,095,738 B1 | 8/2006 | Desanti | |
| 7,119,591 B1 | 10/2006 | Lin | |
| 7,143,153 B1 | 11/2006 | Black et al. | |
| 7,165,120 B1 | 1/2007 | Giles et al. | |
| 7,170,315 B2 | 1/2007 | Bakker et al. | |
| 7,180,866 B1 | 2/2007 | Chartre et al. | |
| 7,203,063 B2 | 4/2007 | Bash et al. | |
| 7,257,655 B1 | 8/2007 | Burney et al. | |
| 7,263,288 B1 | 8/2007 | Islam | |
| 7,274,705 B2 | 9/2007 | Chang et al. | |
| 7,278,582 B1 | 10/2007 | Siegel et al. | |
| 7,310,319 B2 | 12/2007 | Awsienko et al. | |
| 7,325,050 B2 | 1/2008 | O'Connor et al. | |
| 7,337,333 B2 | 2/2008 | O'Conner et al. | |
| 7,340,777 B1 | 3/2008 | Szor | |
| 7,353,362 B2 | 4/2008 | Georgiou et al. | |
| 7,382,154 B2 | 6/2008 | Ramos et al. | |
| 7,386,888 B2 | 6/2008 | Liang et al. | |
| 7,418,534 B2 | 8/2008 | Hayter et al. | |
| 7,437,540 B2 | 10/2008 | Paolucci et al. | |
| 7,447,147 B2 * | 11/2008 | Nguyen | G06F 1/206 370/216 |
| 7,447,197 B2 | 11/2008 | Terrell et al. | |
| 7,466,712 B2 | 12/2008 | Makishima et al. | |
| 7,467,306 B2 | 12/2008 | Cartes et al. | |
| 7,467,358 B2 | 12/2008 | Kang et al. | |
| 7,502,884 B1 | 3/2009 | Shah et al. | |
| 7,519,843 B1 | 4/2009 | Buterbaugh et al. | |
| 7,555,666 B2 | 6/2009 | Brundridge et al. | |
| 7,583,661 B2 | 9/2009 | Chaudhuri | |
| 7,586,841 B2 | 9/2009 | Vasseur | |
| 7,596,144 B2 | 9/2009 | Pong | |
| 7,599,360 B2 | 10/2009 | Edsall et al. | |
| 7,606,225 B2 | 10/2009 | Xie et al. | |
| 7,606,245 B2 | 10/2009 | Ma et al. | |
| 7,616,646 B1 * | 11/2009 | Ma | H04L 12/2896 370/392 |
| 7,620,057 B1 | 11/2009 | Aloni et al. | |
| 7,644,215 B2 | 1/2010 | Wallace et al. | |
| 7,657,677 B2 | 2/2010 | Huang et al. | |
| 7,657,756 B2 | 2/2010 | Hall | |
| 7,660,922 B2 | 2/2010 | Harriman | |
| 7,664,110 B1 | 2/2010 | Lovett et al. | |
| 7,673,164 B1 | 3/2010 | Agarwal | |
| 7,710,936 B2 | 5/2010 | Morales Barroso | |
| 7,719,834 B2 | 5/2010 | Miyamoto et al. | |
| 7,721,125 B2 | 5/2010 | Fung | |
| 7,751,433 B2 | 7/2010 | Dollo et al. | |
| 7,760,720 B2 | 7/2010 | Pullela et al. | |
| 7,761,687 B2 | 7/2010 | Blumrich et al. | |
| 7,783,910 B2 | 8/2010 | Felter et al. | |
| 7,791,894 B2 | 9/2010 | Bechtolsheim | |
| 7,792,113 B1 | 9/2010 | Foschiano et al. | |
| 7,796,399 B2 * | 9/2010 | Clayton | H05K 1/189 174/257 |
| 7,801,132 B2 | 9/2010 | Ofek et al. | |
| 7,802,017 B2 | 9/2010 | Uemura et al. | |
| 7,805,575 B1 | 9/2010 | Agarwal et al. | |
| 7,831,839 B2 | 11/2010 | Hatakeyama | |
| 7,840,703 B2 | 11/2010 | Arimilli et al. | |
| 7,865,614 B2 * | 1/2011 | Lu et al. | 709/241 |
| 7,925,795 B2 * | 4/2011 | Tamir | H04L 41/0803 370/200 |
| 7,934,005 B2 | 4/2011 | Fascenda | |
| 7,970,929 B1 | 6/2011 | Mahalingaiah | |
| 7,975,110 B1 | 7/2011 | Spaur et al. | |
| 7,991,817 B2 | 8/2011 | Dehon et al. | |
| 7,991,922 B2 | 8/2011 | Hayter et al. | |
| 7,992,151 B2 | 8/2011 | Warrier et al. | |
| 8,019,832 B2 | 9/2011 | De Sousa et al. | |
| 8,045,328 B1 * | 10/2011 | Chen | 361/695 |
| 8,060,760 B2 | 11/2011 | Shetty et al. | |
| 8,060,775 B1 | 11/2011 | Sharma et al. | |
| 8,082,400 B1 | 12/2011 | Chang et al. | |
| 8,108,508 B1 | 1/2012 | Goh et al. | |
| 8,122,269 B2 | 2/2012 | Houlihan et al. | |
| 8,132,034 B2 | 3/2012 | Lambert et al. | |
| 8,155,113 B1 | 4/2012 | Agarwal | |
| 8,156,362 B2 | 4/2012 | Branover et al. | |
| 8,165,120 B2 | 4/2012 | Maruccia et al. | |
| 8,170,040 B2 | 5/2012 | Konda | |
| 8,180,996 B2 | 5/2012 | Fullerton et al. | |
| 8,189,612 B2 | 5/2012 | Lemaire et al. | |
| 8,194,659 B2 | 6/2012 | Ban | |
| 8,199,636 B1 | 6/2012 | Rouyer et al. | |
| 8,205,103 B2 | 6/2012 | Kazama et al. | |
| 8,379,425 B2 | 2/2013 | Fukuoka et al. | |
| 8,397,092 B2 * | 3/2013 | Karnowski | 713/324 |
| 8,407,428 B2 | 3/2013 | Cheriton et al. | |
| 8,504,791 B2 | 8/2013 | Cheriton et al. | |
| RE44,610 E | 11/2013 | Krakirian et al. | |
| 8,599,863 B2 | 12/2013 | Davis | |
| 8,684,802 B1 | 4/2014 | Gross et al. | |
| 8,738,860 B1 | 5/2014 | Griffin et al. | |
| 8,745,275 B2 | 6/2014 | Ikeya et al. | |
| 8,745,302 B2 * | 6/2014 | Davis et al. | 710/313 |
| 8,782,321 B2 * | 7/2014 | Harriman et al. | 710/316 |
| 8,812,400 B2 | 8/2014 | Faraboschi et al. | |

(56) References Cited

U.S. PATENT DOCUMENTS

| | | | |
|---|---|---|---|
| 8,824,485 B2* | 9/2014 | Biswas et al. | 370/395.53 |
| 8,854,831 B2* | 10/2014 | Arnouse | 361/798 |
| 8,903,964 B2 | 12/2014 | Breslin | |
| 9,008,079 B2 | 4/2015 | Davis et al. | |
| 9,311,269 B2 | 4/2016 | Davis et al. | |
| 9,465,771 B2 | 10/2016 | Davis et al. | |
| 2001/0046227 A1 | 11/2001 | Matsuhira et al. | |
| 2002/0004912 A1 | 1/2002 | Fung | |
| 2002/0040391 A1 | 4/2002 | Chaiken et al. | |
| 2002/0083352 A1 | 6/2002 | Fujimoto et al. | |
| 2002/0097732 A1 | 7/2002 | Worster et al. | |
| 2002/0107903 A1 | 8/2002 | Richter et al. | |
| 2002/0124128 A1 | 9/2002 | Qiu | |
| 2002/0159452 A1 | 10/2002 | Foster et al. | |
| 2002/0161917 A1 | 10/2002 | Shapiro et al. | |
| 2002/0172205 A1 | 11/2002 | Tagore-Brage et al. | |
| 2002/0186656 A1* | 12/2002 | Vu | 370/229 |
| 2002/0194412 A1 | 12/2002 | Bottom | |
| 2002/0196611 A1 | 12/2002 | Ho et al. | |
| 2003/0007493 A1 | 1/2003 | Oi et al. | |
| 2003/0033547 A1 | 2/2003 | Larson et al. | |
| 2003/0041266 A1 | 2/2003 | Ke et al. | |
| 2003/0076832 A1 | 4/2003 | Ni | |
| 2003/0093255 A1 | 5/2003 | Freyensee et al. | |
| 2003/0093624 A1 | 5/2003 | Arimilli et al. | |
| 2003/0110262 A1 | 6/2003 | Hasan et al. | |
| 2003/0140190 A1 | 7/2003 | Mahony et al. | |
| 2003/0158940 A1* | 8/2003 | Leigh | 709/226 |
| 2003/0159083 A1 | 8/2003 | Fukuhara et al. | |
| 2003/0172191 A1 | 9/2003 | Williams | |
| 2003/0188083 A1 | 10/2003 | Kumar et al. | |
| 2003/0193402 A1 | 10/2003 | Post et al. | |
| 2003/0202520 A1* | 10/2003 | Witkowski | H04L 12/5601 370/400 |
| 2003/0231624 A1 | 12/2003 | Alappat et al. | |
| 2004/0013113 A1 | 1/2004 | Singh et al. | |
| 2004/0017806 A1 | 1/2004 | Yazdy et al. | |
| 2004/0017808 A1 | 1/2004 | Forbes et al. | |
| 2004/0030938 A1* | 2/2004 | Barr et al. | 713/300 |
| 2004/0068676 A1 | 4/2004 | Larson et al. | |
| 2004/0111612 A1 | 6/2004 | Choi et al. | |
| 2004/0141521 A1* | 7/2004 | George | 370/463 |
| 2004/0165588 A1 | 8/2004 | Pandya | |
| 2004/0210693 A1 | 10/2004 | Zeitler et al. | |
| 2004/0215864 A1 | 10/2004 | Arimilli et al. | |
| 2004/0215991 A1 | 10/2004 | McAfee et al. | |
| 2004/0267486 A1 | 12/2004 | Percer et al. | |
| 2005/0015378 A1 | 1/2005 | Gammel et al. | |
| 2005/0018604 A1* | 1/2005 | Dropps et al. | 370/229 |
| 2005/0018606 A1* | 1/2005 | Dropps et al. | 370/230 |
| 2005/0018663 A1* | 1/2005 | Dropps | H04L 12/10 370/360 |
| 2005/0021606 A1 | 1/2005 | Davies et al. | |
| 2005/0021728 A1 | 1/2005 | Sugimoto | |
| 2005/0030954 A1* | 2/2005 | Dropps | H04L 45/00 370/395.31 |
| 2005/0033742 A1 | 2/2005 | Kamvar et al. | |
| 2005/0033890 A1 | 2/2005 | Lee | |
| 2005/0044195 A1 | 2/2005 | Westfall | |
| 2005/0077921 A1 | 4/2005 | Percer et al. | |
| 2005/0105538 A1 | 5/2005 | Perera et al. | |
| 2005/0141424 A1 | 6/2005 | Lim et al. | |
| 2005/0228852 A1 | 10/2005 | Santos et al. | |
| 2005/0240688 A1 | 10/2005 | Moerman et al. | |
| 2006/0002311 A1 | 1/2006 | Iwanaga et al. | |
| 2006/0013218 A1 | 1/2006 | Shore et al. | |
| 2006/0023245 A1 | 2/2006 | Sato et al. | |
| 2006/0029053 A1 | 2/2006 | Roberts et al. | |
| 2006/0090025 A1 | 4/2006 | Tufford et al. | |
| 2006/0136570 A1 | 6/2006 | Pandya | |
| 2006/0140211 A1 | 6/2006 | Huang et al. | |
| 2006/0174342 A1 | 8/2006 | Zaheer et al. | |
| 2006/0179241 A1 | 8/2006 | Clark et al. | |
| 2006/0236371 A1 | 10/2006 | Fish | |
| 2006/0248359 A1 | 11/2006 | Fung | |
| 2006/0259734 A1 | 11/2006 | Sheu et al. | |
| 2006/0265609 A1 | 11/2006 | Fung | |
| 2007/0006001 A1 | 1/2007 | Isobe et al. | |
| 2007/0047195 A1 | 3/2007 | Merkin et al. | |
| 2007/0076653 A1 | 4/2007 | Park et al. | |
| 2007/0081315 A1 | 4/2007 | Mondor et al. | |
| 2007/0094486 A1 | 4/2007 | Moore et al. | |
| 2007/0109968 A1 | 5/2007 | Hussain et al. | |
| 2007/0130397 A1* | 6/2007 | Tsu | 710/62 |
| 2007/0174390 A1 | 7/2007 | Silvain et al. | |
| 2007/0180310 A1 | 8/2007 | Johnson et al. | |
| 2007/0209072 A1 | 9/2007 | Chen | |
| 2007/0226795 A1 | 9/2007 | Conti et al. | |
| 2007/0280230 A1 | 12/2007 | Park | |
| 2007/0286009 A1 | 12/2007 | Norman | |
| 2007/0288585 A1 | 12/2007 | Sekiguchi et al. | |
| 2008/0013453 A1 | 1/2008 | Chiang et al. | |
| 2008/0040463 A1 | 2/2008 | Brown et al. | |
| 2008/0052437 A1 | 2/2008 | Loffink et al. | |
| 2008/0059782 A1 | 3/2008 | Kruse et al. | |
| 2008/0075089 A1 | 3/2008 | Evans et al. | |
| 2008/0089358 A1 | 4/2008 | Basso et al. | |
| 2008/0104264 A1* | 5/2008 | Duerk et al. | 709/230 |
| 2008/0140771 A1 | 6/2008 | Vass et al. | |
| 2008/0140930 A1* | 6/2008 | Hotchkiss | 711/114 |
| 2008/0159745 A1 | 7/2008 | Segal | |
| 2008/0162691 A1 | 7/2008 | Zhang et al. | |
| 2008/0183882 A1 | 7/2008 | Flynn et al. | |
| 2008/0186965 A1 | 8/2008 | Zheng et al. | |
| 2008/0199133 A1 | 8/2008 | Takizawa et al. | |
| 2008/0212273 A1 | 9/2008 | Bechtolsheim | |
| 2008/0212276 A1 | 9/2008 | Bottom et al. | |
| 2008/0217021 A1 | 9/2008 | Lembcke et al. | |
| 2008/0222434 A1 | 9/2008 | Shimizu et al. | |
| 2008/0235443 A1 | 9/2008 | Chow et al. | |
| 2008/0239649 A1 | 10/2008 | Bradicich et al. | |
| 2008/0243634 A1* | 10/2008 | Dworkin et al. | 705/26 |
| 2008/0250181 A1 | 10/2008 | Li et al. | |
| 2008/0259555 A1 | 10/2008 | Bechtolsheim et al. | |
| 2008/0259788 A1 | 10/2008 | Wang et al. | |
| 2008/0266793 A1* | 10/2008 | Lee | 361/695 |
| 2008/0270599 A1 | 10/2008 | Tamir et al. | |
| 2008/0288660 A1 | 11/2008 | Balasubramanian et al. | |
| 2008/0288664 A1* | 11/2008 | Pettey et al. | 710/5 |
| 2008/0288683 A1* | 11/2008 | Ramey | 710/105 |
| 2008/0301794 A1 | 12/2008 | Lee | |
| 2008/0310848 A1 | 12/2008 | Yasuda et al. | |
| 2008/0313369 A1 | 12/2008 | Verdoorn et al. | |
| 2008/0320161 A1 | 12/2008 | Maruccia et al. | |
| 2009/0021907 A1* | 1/2009 | Mann et al. | 361/686 |
| 2009/0044036 A1 | 2/2009 | Merkin | |
| 2009/0063443 A1 | 3/2009 | Arimilli et al. | |
| 2009/0064287 A1 | 3/2009 | Bagepalli et al. | |
| 2009/0080428 A1 | 3/2009 | Witkowski et al. | |
| 2009/0097200 A1 | 4/2009 | Sharma et al. | |
| 2009/0113130 A1 | 4/2009 | He et al. | |
| 2009/0133129 A1 | 5/2009 | Jeong et al. | |
| 2009/0135751 A1 | 5/2009 | Hodges et al. | |
| 2009/0135835 A1 | 5/2009 | Gallatin et al. | |
| 2009/0158070 A1 | 6/2009 | Gruendler | |
| 2009/0172423 A1 | 7/2009 | Song et al. | |
| 2009/0198958 A1 | 8/2009 | Arimilli et al. | |
| 2009/0204834 A1 | 8/2009 | Hendin et al. | |
| 2009/0204837 A1 | 8/2009 | Raval et al. | |
| 2009/0216920 A1 | 8/2009 | Lauterbach et al. | |
| 2009/0219827 A1* | 9/2009 | Chen et al. | 370/252 |
| 2009/0222884 A1 | 9/2009 | Shaji et al. | |
| 2009/0225751 A1 | 9/2009 | Koenck et al. | |
| 2009/0235104 A1 | 9/2009 | Fung | |
| 2009/0248943 A1 | 10/2009 | Jiang et al. | |
| 2009/0251867 A1 | 10/2009 | Sharma et al. | |
| 2009/0259863 A1 | 10/2009 | Williams et al. | |
| 2009/0259864 A1 | 10/2009 | Li et al. | |
| 2009/0265045 A1 | 10/2009 | Coxe, III | |
| 2009/0271656 A1 | 10/2009 | Yokota et al. | |
| 2009/0276666 A1 | 11/2009 | Haley et al. | |
| 2009/0279518 A1 | 11/2009 | Falk et al. | |
| 2009/0282274 A1 | 11/2009 | Langgood et al. | |
| 2009/0282419 A1 | 11/2009 | Mejdrich et al. | |

(56) References Cited

U.S. PATENT DOCUMENTS

| | | |
|---|---|---|
| 2009/0313390 A1 | 12/2009 | Ahuja et al. |
| 2010/0005331 A1 | 1/2010 | Somasundaram et al. |
| 2010/0008038 A1* | 1/2010 | Coglitore .................. G06F 1/20 361/679.48 |
| 2010/0008365 A1 | 1/2010 | Porat |
| 2010/0026408 A1* | 2/2010 | Shau ................................ 333/1 |
| 2010/0040053 A1 | 2/2010 | Gottumukkula et al. |
| 2010/0049822 A1 | 2/2010 | Davies et al. |
| 2010/0051391 A1 | 3/2010 | Jahkonen |
| 2010/0106987 A1 | 4/2010 | Lambert et al. |
| 2010/0118880 A1* | 5/2010 | Kunz et al. .................... 370/401 |
| 2010/0125742 A1 | 5/2010 | Ohtani |
| 2010/0125915 A1 | 5/2010 | Hall et al. |
| 2010/0138481 A1 | 6/2010 | Behrens |
| 2010/0158005 A1 | 6/2010 | Mukhopadhyay et al. |
| 2010/0161909 A1 | 6/2010 | Nation et al. |
| 2010/0165983 A1* | 7/2010 | Aybay ...................... H04L 49/00 370/388 |
| 2010/0169479 A1 | 7/2010 | Jeong et al. |
| 2010/0198972 A1 | 8/2010 | Umbehocker |
| 2010/0198985 A1 | 8/2010 | Kanevsky et al. |
| 2010/0218194 A1 | 8/2010 | Dallman et al. |
| 2010/0220732 A1 | 9/2010 | Hussain et al. |
| 2010/0250914 A1 | 9/2010 | Abdul et al. |
| 2010/0265650 A1 | 10/2010 | Chen et al. |
| 2010/0281246 A1 | 11/2010 | Bristow et al. |
| 2010/0299548 A1 | 11/2010 | Chadirchi et al. |
| 2010/0308897 A1 | 12/2010 | Evoy et al. |
| 2010/0312910 A1 | 12/2010 | Lin et al. |
| 2010/0312969 A1 | 12/2010 | Yamazaki et al. |
| 2010/0318812 A1 | 12/2010 | Auradkar et al. |
| 2011/0023104 A1 | 1/2011 | Franklin |
| 2011/0026397 A1 | 2/2011 | Saltsidis et al. |
| 2011/0029652 A1 | 2/2011 | Chhuor et al. |
| 2011/0058573 A1 | 3/2011 | Balakavi et al. |
| 2011/0075369 A1 | 3/2011 | Sun et al. |
| 2011/0090633 A1 | 4/2011 | Rabinovitz |
| 2011/0103391 A1 | 5/2011 | Davis et al. |
| 2011/0113115 A1 | 5/2011 | Chang et al. |
| 2011/0119344 A1 | 5/2011 | Eustis |
| 2011/0123014 A1* | 5/2011 | Smith ................ H04L 49/1515 379/242 |
| 2011/0138046 A1 | 6/2011 | Bonnier et al. |
| 2011/0185370 A1* | 7/2011 | Tamir .................. H04L 41/0803 719/324 |
| 2011/0191514 A1 | 8/2011 | Wu et al. |
| 2011/0191610 A1 | 8/2011 | Agarwal et al. |
| 2011/0197012 A1 | 8/2011 | Liao et al. |
| 2011/0210975 A1 | 9/2011 | Wong et al. |
| 2011/0239014 A1 | 9/2011 | Karnowski |
| 2011/0271159 A1 | 11/2011 | Ahn et al. |
| 2011/0273840 A1* | 11/2011 | Chen ......................... 361/679.48 |
| 2011/0295991 A1* | 12/2011 | Aida ............................ 709/223 |
| 2011/0296141 A1 | 12/2011 | Daffron |
| 2011/0320690 A1 | 12/2011 | Petersen et al. |
| 2012/0011500 A1 | 1/2012 | Faraboschi et al. |
| 2012/0020207 A1 | 1/2012 | Corti et al. |
| 2012/0050981 A1 | 3/2012 | Xu et al. |
| 2012/0054469 A1 | 3/2012 | Ikeya et al. |
| 2012/0054511 A1 | 3/2012 | Brinks et al. |
| 2012/0081850 A1 | 4/2012 | Regimbal et al. |
| 2012/0096211 A1 | 4/2012 | Davis et al. |
| 2012/0099265 A1 | 4/2012 | Reber |
| 2012/0131201 A1 | 5/2012 | Matthews et al. |
| 2012/0155168 A1 | 6/2012 | Kim et al. |
| 2012/0198252 A1 | 8/2012 | Kirschtein et al. |
| 2012/0207165 A1 | 8/2012 | Davis |
| 2012/0297042 A1 | 11/2012 | Davis et al. |
| 2013/0010639 A1 | 1/2013 | Armstrong et al. |
| 2013/0024645 A1 | 1/2013 | Cheriton et al. |
| 2013/0031331 A1 | 1/2013 | Cheriton et al. |
| 2013/0058250 A1 | 3/2013 | Casado et al. |
| 2013/0094499 A1 | 4/2013 | Davis et al. |
| 2013/0097448 A1 | 4/2013 | Davis et al. |
| 2013/0111107 A1 | 5/2013 | Chang et al. |
| 2013/0148667 A1* | 6/2013 | Hama et al. .................. 370/400 |
| 2013/0163605 A1 | 6/2013 | Chandra et al. |
| 2013/0290643 A1 | 10/2013 | Lim et al. |
| 2013/0290650 A1 | 10/2013 | Chang et al. |
| 2013/0318269 A1 | 11/2013 | Dalal et al. |
| 2014/0122833 A1 | 5/2014 | Davis et al. |
| 2014/0359044 A1 | 12/2014 | Davis et al. |
| 2014/0365596 A1 | 12/2014 | Kanevsky et al. |
| 2015/0039840 A1 | 2/2015 | Chandra et al. |
| 2015/0103826 A1 | 4/2015 | Davis |

FOREIGN PATENT DOCUMENTS

| | | |
|---|---|---|
| TW | M377621 | 4/2010 |
| TW | 201017430 | 5/2010 |
| WO | WO-2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

Chapter 1 Overview of the Origin Family Architecture from Origin and Onyx2 Theory of Operations Manual, published 1997, 18 pages.
Cisco MDS 9000 Family Multiprotocol Services Module, published 2006, 13 pages.
Comparing the I2C BUS to the SMBUS, Maxim Integrated, Dec. 1, 2000, p. 1.
Deering, "IP Multicast Extensions for 4.3BSD UNIX and related Systems," Jun. 1999, 5 pages.
Extended European Search Report for EP 10827330.1, dated Jun. 5, 2013.
Final Office Action on U.S. Appl. No. 12/794,996, dated Jun. 19, 2013.
Final Office Action on U.S. Appl. No. 13/624,725, dated Nov. 13, 2013.
Final Office Action on U.S. Appl. No. 13/624,731, dated Jul. 25, 2014.
Final Office Action on U.S. Appl. No. 13/705,340, dated Aug. 2, 2013.
Final Office Action on U.S. Appl. No. 13/705,414, dated Aug. 9, 2013.
Final Office Action on U.S. Appl. No. 13/624,731, dated Nov. 12, 2013.
fpga4fun.com,"What is JTAG?", 2 pages, Jan. 31, 2010.
From AT to BTX: Motherboard Form Factor, Webopedia, Apr. 29, 2005, p. 1.
HP Virtual Connect Traffic Flow—Technology brief, Jan. 2012, 22 pages.
International Preliminary Report on Patentability for PCT/US2012/038986 dated Nov. 26, 2013.
International Preliminary Report on Patentability issued on PCT/US12/62608, dated May 6, 2014.
International Search Report and Written Opinion for PCT/US12/38987, dated Aug. 16, 2012.
International Search Report and Written Opinion for PCT/US12/62608, dated Jan. 18, 2013.
International Search Report and Written Opinion for PCT/US2010/053227, dated May 10, 2012.
International Search Report and Written Opinion on PCT/US2012/038986, dated Mar. 14, 2013.
Jansen et al., "SATA-IO to Develop Specification for Mini Interface Connector" Press Release Sep. 21, 2009, Serial ATA3 pages.
Nawathe et al., "Implementation of an 8-Core, 64-Thread, Power Efficient SPARC Server on a Chip", IEEE Journal of Solid-State Circuits, vol. 43, No. 1, Jan. 2008, pp. 6-20.
Non-Final Action on U.S. Appl. No. 13/728,362, dated Feb. 21, 2014.
Non-Final Office Action on U.S. Appl. No. 13/475,722, dated Jan. 17, 2014.

(56) References Cited

OTHER PUBLICATIONS

Non-Final Office Action on U.S. Appl. No. 12/794,996, dated Sep. 17, 2012.
Non-Final Office Action on U.S. Appl. No. 13/453,086, dated Mar. 12, 2013.
Non-Final Office Action on U.S. Appl. No. 13/475,713, dated Apr. 1, 2014.
Non-Final Office Action on U.S. Appl. No. 13/527,505, dated May 8, 2014.
Non-Final Office Action on U.S. Appl. No. 13/527,498, dated May 8, 2014.
Non-Final Office Action on U.S. Appl. No. 13/624,725, dated Jan. 10, 2013.
Non-final office action on U.S. Appl. No. 13/624,731 dated Jan. 29, 2013.
Non-Final Office Action on U.S. Appl. No. 13/692,741, dated Sep. 4, 2014.
Non-Final Office Action on U.S. Appl. No. 13/705,286, dated May 13, 2013.
Non-Final Office Action on U.S. Appl. No. 13/705,340, dated Mar. 12, 2014.
Non-Final Office Action on U.S. Appl. No. 13/705,340, dated Mar. 29, 2013.
Non-Final Office Action on U.S. Appl. No. 13/705,414, dated Apr. 9, 2013.
Non-Final Office Action on U.S. Appl. No. 13/705,428, dated Jul. 10, 2013.
Notice of Allowance on U.S. Appl. No. 13/453,086, dated Jul. 18, 2013.
Notice of Allowance on U.S. Appl. No. 13/705,386, dated Jan. 24, 2014.
Notice of Allowance on U.S. Appl. No. 13/705,414, dated Nov. 4, 2013.
Venaas, "IPv4 Multicast Address Space Registry," 2013, http://www.iana.org/assignments/multicast-addresses/multicast-addresses.xhtml.
PCT/US2011/051996, International Search Report dated Jan. 19, 2012 (2 pages).
PCT/US2011/051996, Written Opinion dated Jan. 19, 2012 (9 pages).
Final Office Action on U.S. Appl. No. 13/527,505, dated Dec. 5, 2014.
Notice of Allowance on U.S. Appl. No. 13/705340, dated Dec. 3, 2014.
Non-Final Office Action on U.S. Appl. No. 14/106,698, dated Feb. 12, 2015.
Notice of Allowance on U.S. Appl. No. 13/475,713, dated Feb. 5, 2015.
Reexamination Report on Japanese Application 2012-536877, dated Jan. 22, 2015 (English Translation not available).
Search Report on EP Application 10827330.1, dated Feb. 12, 2015.
Final Office Action on U.S. Appl. No. 13/692,741, dated Mar. 11, 2015.
Notice of Allowance on U.S. Appl. No. 13/475,722, dated Feb. 27, 2015.
Notice of Allowance on U.S. Appl. No. 13/527,498, dated Feb. 23, 2015.
Notice of Allowance on U.S. Appl. No. 13/527,505, dated Mar. 6, 2015.
Notice of Allowance on U.S. Appl. No. 13/624,731, dated Mar. 5, 2015.
Non-Final Office Action on U.S. Appl. No. 13/624,725, dated Apr. 23, 2015.
Non-Final Office Action on U.S. Appl. No. 14/052,723, dated May 1, 2015.
Non-Final Office Action on U.S. Appl. No. 13/728,308, dated May 14, 2015.
Final Office Action on U.S. Appl. No. 12/889,721, dated May 22, 2015.
Final Office Action on U.S. Appl. No. 12/889,721, dated Apr. 17, 2014.
Final Office Action on U.S. Appl. No. 13/475,713, dated Oct. 17, 2014.
Final Office Action on U.S. Appl. No. 13/475,722, dated Oct. 20, 2014.
International Preliminary Report on Patentability for PCT/US2009/044200, dated Nov. 17, 2010.
International Preliminary Report on Patentability for PCT/US2012/061747, dated Apr. 29, 2014.
International Search Report and Written Opinion for PCT/US12/61747, dated Mar. 1, 2013.
International Search Report and Written Opinion on PCT/US09/44200, dated Jul. 1, 2009.
Non-Final Office Action on U.S. Appl. No. 12/889,721, dated Jul. 2, 2013.
Non-Final Office Action on U.S. Appl. No. 12/889,721, dated Oct. 11, 2012.
Non-Final Office Action on U.S. Appl. No. 12/889,721, dated Sep. 29, 2014.
Non-Final Office Action on U.S. Appl. No. 13/284,855, dated Dec. 19, 2013.
Notice of Allowance on U.S. Appl. No. 13/284,855, dated Jul. 14, 2014.
Final Office Action on U.S. Appl. No. 13/527,498, dated Nov. 17, 2014.
Non-Final Office Action on U.S. Appl. No. 13/662,759, dated Nov. 6, 2014.
Elghany et al., "High Throughput High Performance NoC Switch," NORCHIP 2008, Nov. 2008, pp. 237-240.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on CHIP," 2005 IEEE Pacific Rim Conference on Communications, Computers and Signal Processing, Aug. 2005, pp. 613-616.
Non-Final Office Action on U.S. Appl. No. 14/334,931, dated Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Final Office Action on U.S. Appl. No. 14/052,723, dated Dec. 3, 2015.
Notice of Allowance on U.S. Appl. No. 13/692,741 dated Dec. 4, 2015.
Non-Final Office Action on U.S. Appl. No. 14/334,931 dated Dec. 11, 2015.
Notice of Allowance U.S. Appl. No. 13/728,308, dated Oct. 7, 2015.
Office Action on Taiwan Application 100133390, dated Aug. 25, 2015 (English translation not available).
Non-Final Office Action on U.S. Appl. No. 14/106,697, dated Aug. 17, 2015.
Office Action on Taiwan Application 101139729, dated May 25, 2015 (English translation not available).
Final Office Action on U.S. Appl. No. 13/662,759, dated Feb. 22, 2016.
Final Office Action on U.S. Appl. No. 14/106,697 dated Feb. 2, 2016.
Non-Final Office Action on U.S. Appl. No. 12/889,721, dated Feb. 24, 2016.
Das et al., "Unifying Packet and Circuit Switched Networks," IEEE Globecom Workshops 2009, Nov. 30, 2009, pp. 1-6.
Final Office Action on U.S. Appl. No. 13/624,725 dated Mar. 10, 2016.
Non-Final Office Action on U.S. Appl. No. 14/725,543 dated Apr. 7, 2016.
Notice of Allowance on U.S. Appl. No. 13/624,725, dated Mar. 30, 2016.
Non-Final Office Action on U.S. Appl. No. 14/334,178 dated Dec. 18, 2015.
Final Office Action on U.S. Appl. No. 12/889,721 dated Aug. 2, 2016.

(56) References Cited

OTHER PUBLICATIONS

Final Office Action on U.S. Appl. No. 13/728,428 dated May 6, 2016.
Notice of Allowance on U.S. Appl. No. 14/334,931 dated May 20, 2016.
Notice of Allowance on U.S. Appl. No. 13/662,759 dated May 10, 2016.
Notice of Allowance on U.S. Appl. No. 14/334,178 dated Jun. 8, 2016.
Notice of Allowance on U.S. Appl. No. 13/728,428 dated Jul. 18, 2016.
Notice of Allowance on U.S. Appl. No. 14/725,543 dated Jul. 21, 2016.
HP ProLiant SL6500 Scalable System, Family data sheet, HP Technical sheet, Sep. 2010 4 pages.
Non-Final Office Action on U.S. Appl. No. 15/281,462 dated Feb. 10, 2017.
Notice of Allowance issued on U.S. Appl. No. 14/052,723, dated Feb. 8, 2017.
Non-Final Office Action on U.S. Appl. No. 14/753,948 dated Nov. 4, 2016.
Notice of Allowance on U.S. Appl. No. 14/106,697 dated Oct. 24, 2016.
Non-Final Office Action on U.S. Appl. No. 14/809,723 dated Dec. 30, 2016.
Non-Final Office Action on U.S. Appl. No. 15/270,418 dated Apr. 21, 2017.
Notice of Allowance on U.S. Appl. No. 15/360,668, dated May 5, 2017.
Final Office Action on U.S. Appl. No. 15/281,462 dated Jun. 13, 2017.
Non-Final Office Action on U.S. Appl. No. 15/254,111 dated Jun. 20, 2017.
Notice of Allowance on U.S. Appl. No. 14/753,948 dated Jun. 14, 2017.
Final Office Action on U.S. Appl. No. 14/334,178, dated Nov. 4, 2015.
Final Office Action on U.S. Appl. No. 14/334,931, dated Jul. 9, 2015.
Non-Final Office Action on U.S. Appl. No. 13/692,741, dated Jul. 1, 2015.
Non-Final Office Action on U.S. Appl. No. 13/728,428, dated Jun. 12, 2015.
Final Office Action on U.S. Appl. No. 14/809,723 dated Aug. 25, 2017.
Non-Final Office Action on U.S. Appl. No. 15/078,115 dated Sep. 5, 2017.
Notice of Allowance on U.S. Appl. No. 15/254,111 dated Sep. 1, 2017.
Non-Final Office Action on U.S. Appl. No. 15/357,332 dated Nov. 9, 2017.
Notice of Allowance on U.S. Appl. No. 15/270,418 dated Nov. 2, 2017.

* cited by examiner

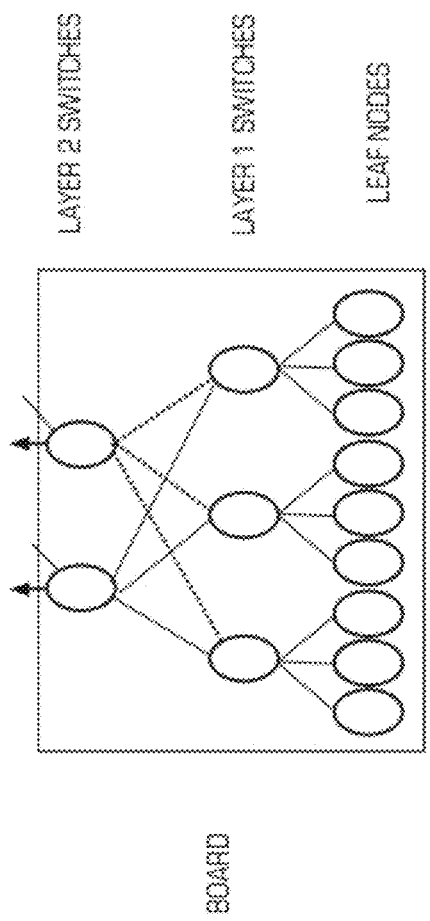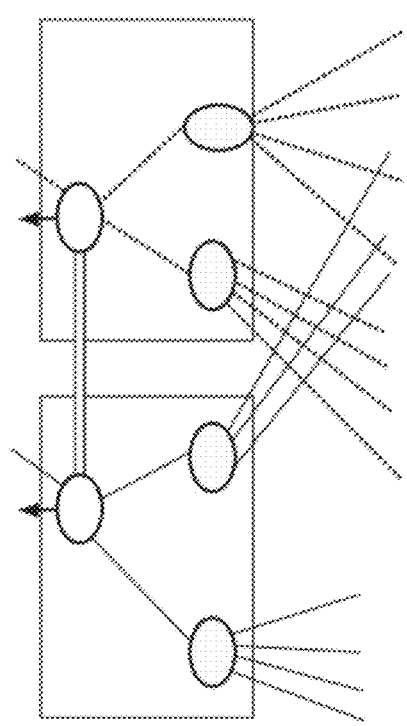
FIGURE 6

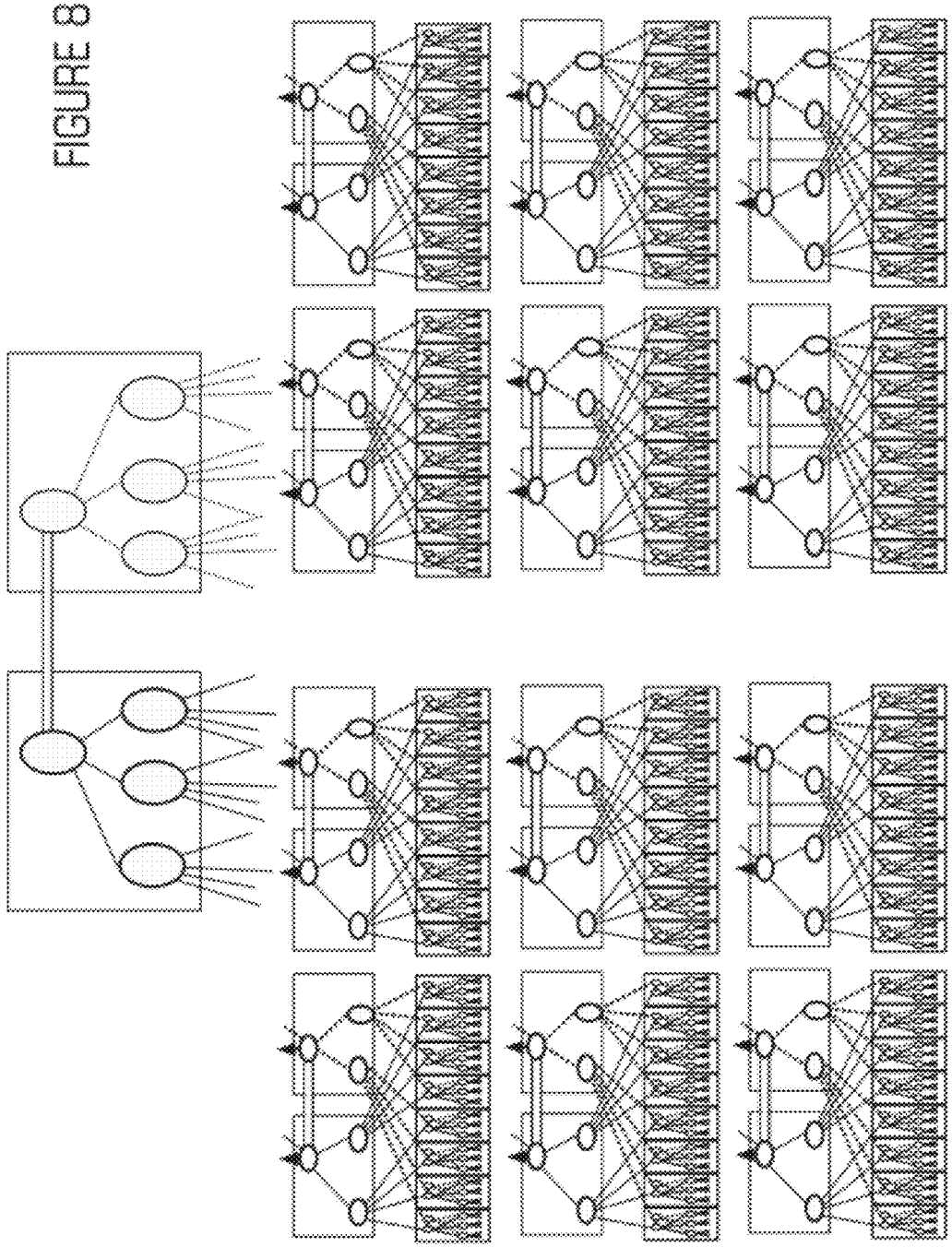

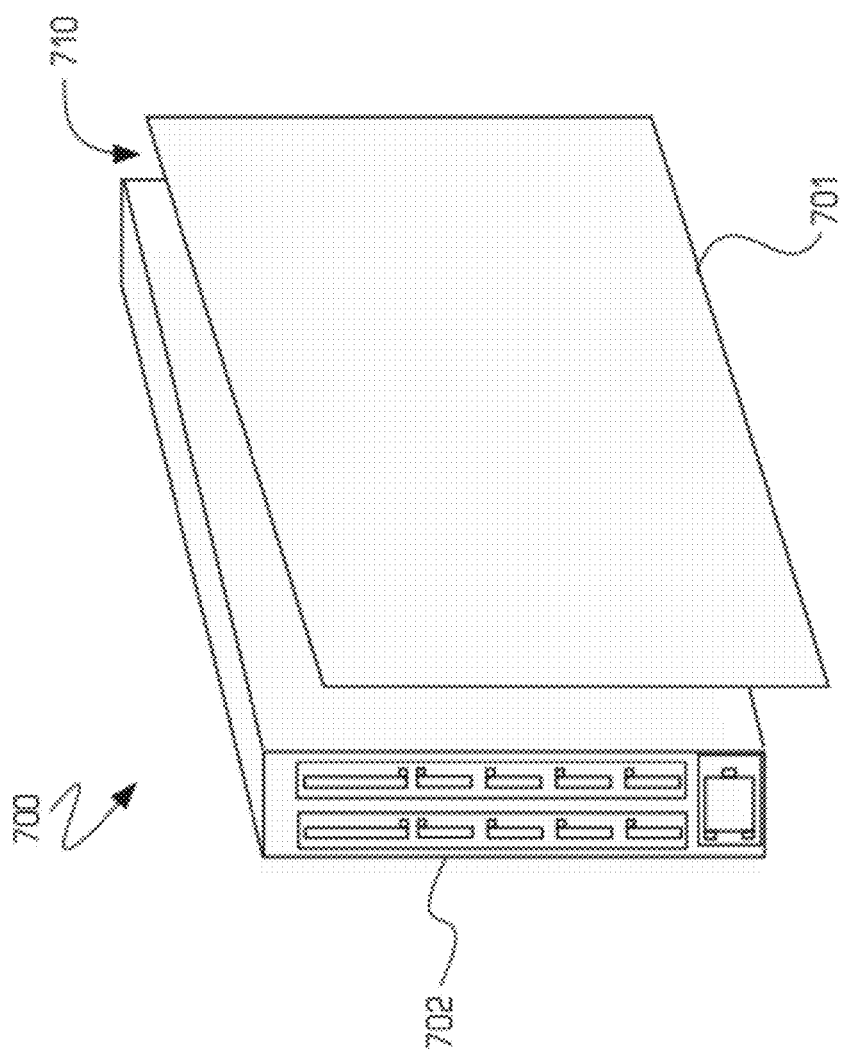

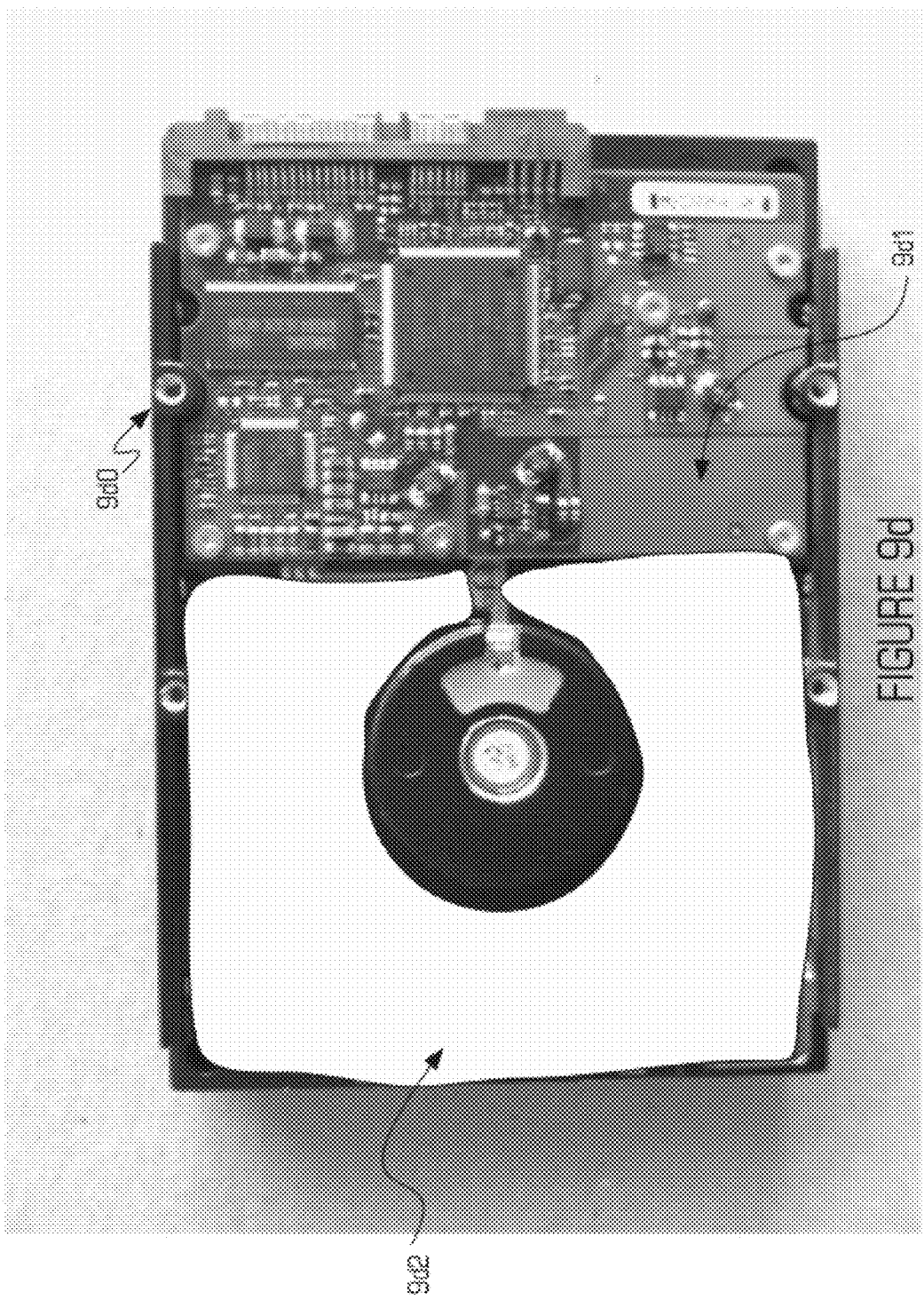

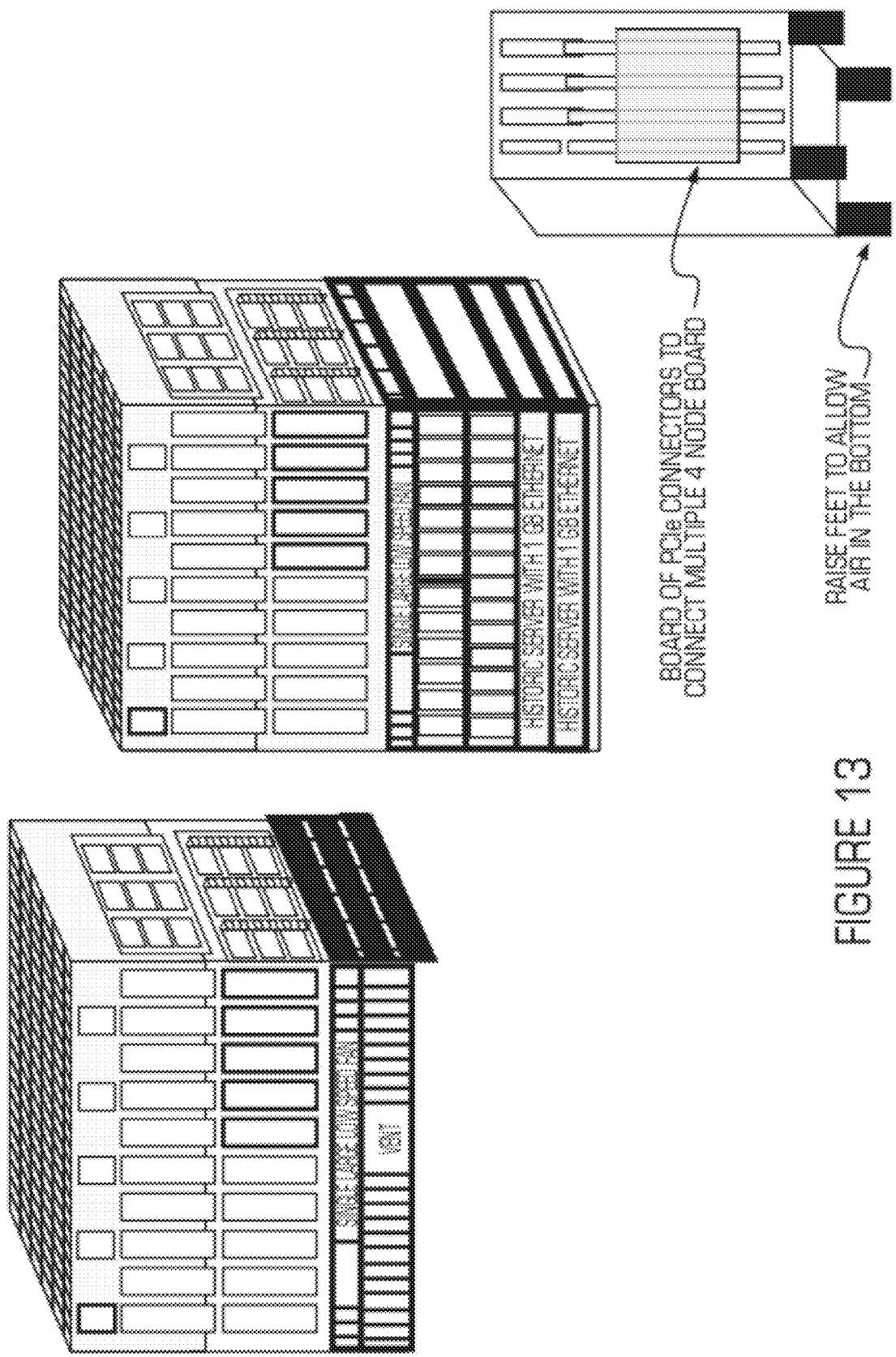

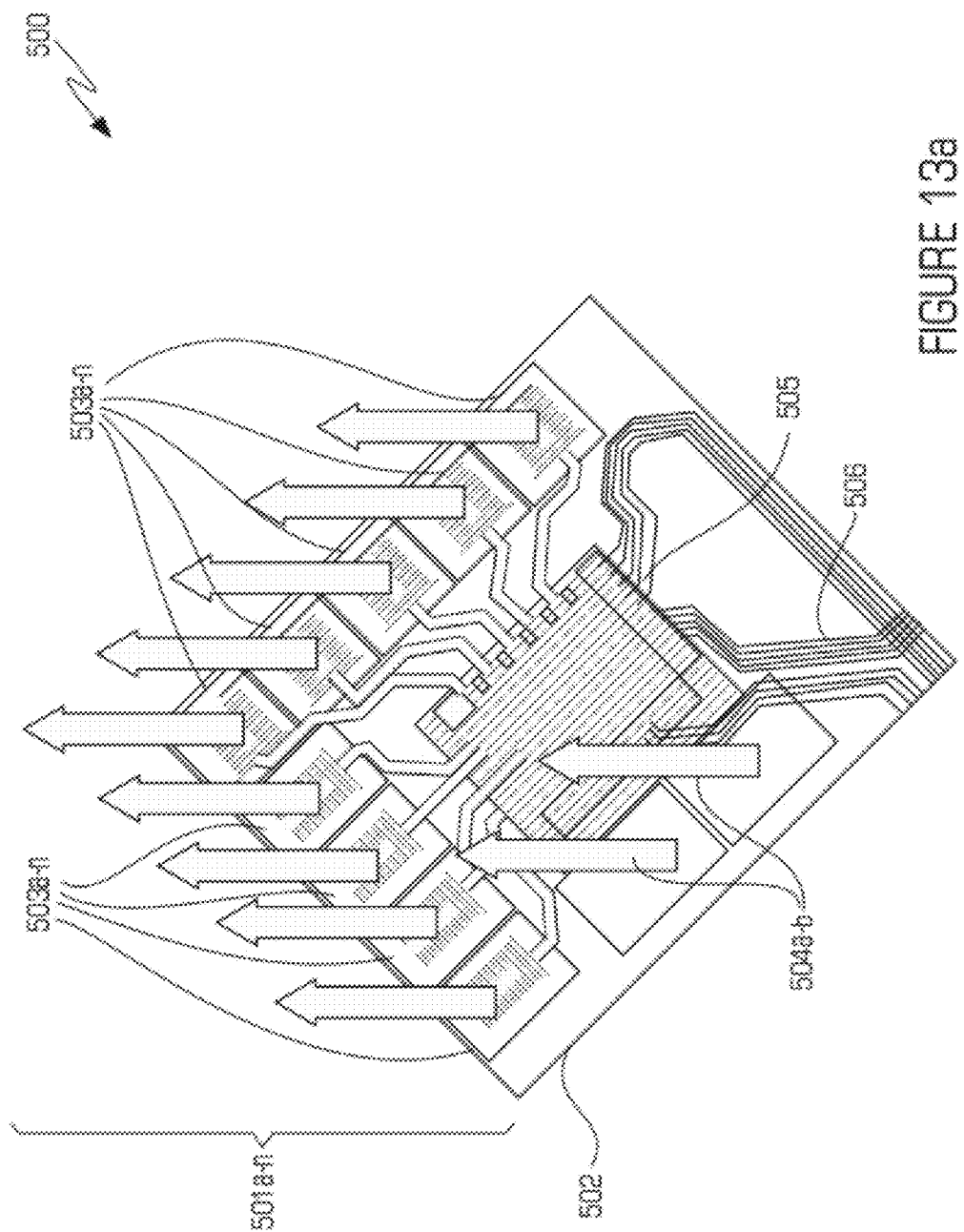

PERFORMANCE AND POWER OPTIMIZED COMPUTER SYSTEM ARCHITECTURES AND METHODS LEVERAGING POWER OPTIMIZED TREE FABRIC INTERCONNECT

PRIORITY CLAIMS/RELATED APPLICATIONS

This application claims priority under 35 USC 120 to U.S. patent application Ser. No. 12/794,996 filed on Jun. 7, 2010 and entitled "System and Method for High-Performance, Low-Power Data Center Interconnect Fabric", the entirety of which is incorporated herein by reference. In addition, this patent application claims the benefit under 35 USC 119(e) and 120 of U.S. Provisional Patent Application Ser. No. 61/383,585 filed on Sep. 16, 2010 and entitled "Performance and Power Optimized Computer System Architectures and Methods Leveraging Power Optimized Tree Fabric Interconnect", the entirety of which is incorporated herein by reference.

BACKGROUND

FIGS. 1 and 2 show a classic data center network aggregation as is currently well known. FIG. 1 shows a diagrammatical view of a typical network data center architecture 100 wherein top level switches 101a-n are at the tops of racks 102a-n filled with blade servers 107a-n interspersed with local routers 103a-f, 105a-b and additional rack units 108a-n contain additional servers 104 e-k and routers 106a-g. FIG. 2 shows an exemplary physical view 110 of a system with peripheral servers 111a-bn arranged around edge router systems 112a-h, which are placed around centrally located core switching systems 113. Typically such an aggregation 110 has 1-Gb Ethernet from the rack servers to their top of rack switches, and often 10 Gb Ethernet ports to the edge and core routers.

BRIEF DESCRIPTION OF THE DRAWINGS

FIG. 6 illustrates a server board that composes multiple server nodes interconnected with the described point-to-point interconnect;

FIG. 8 shows an example of extending the fabric across shelves and linking shelves across a server rack;

FIG. 9a shows an exemplary server 700 with a disk form factor;

FIG. 9d illustrates a standard 3.5 inch drive;

FIG. 13 illustrates an implementation of rack chimney cooling;

FIG. 13a shows an exemplary illustration of the heat convection used in the chimney rack cooling shown in FIG. 13;

DETAILED DESCRIPTION OF ONE OR MORE EMBODIMENTS

A performance and power optimized computer system architecture and method leveraging power optimized tree fabric interconnect are disclosed. One embodiment builds low power server clusters leveraging the fabric with tiled building blocks while another embodiment implements storage solutions or cooling solutions. Yet another embodiment uses the fabric to switch other things.

Co-pending patent application Ser. No. 12/794,996 describes the architecture of a power optimized server communication fabric that support routings using a tree-like or graph topology that supports multiple links per node, where each link is designated as an Up, Down, or Lateral link, within the topology. The system uses a segmented MAC architecture which may have a method of re-purposing MAC IP addresses for inside MACs and outside MACs, and leveraging what would normally be the physical signaling for the MAC to feed into the switch. The Calxeda XAUI system interconnect reduces power, wires and the size of the rack. There is no need for high powered, expensive Ethernet switches and high-power Ethernet Phys on the individual servers. It dramatically reduces cables (cable complexity, costs, significant source of failures). It also enables a heterogeneous server mixture inside the rack, supporting any equipment that uses Ethernet or SATA or PCIe. In this architecture, power savings is primarily from two architectural aspects: 1) the minimization of Ethernet Phys across the fabric, replacing them with point to point XAUI interconnects between nodes, and 2) the ability to dynamically adjust the XAUI width and speed of the links based upon load.

Figure 3:
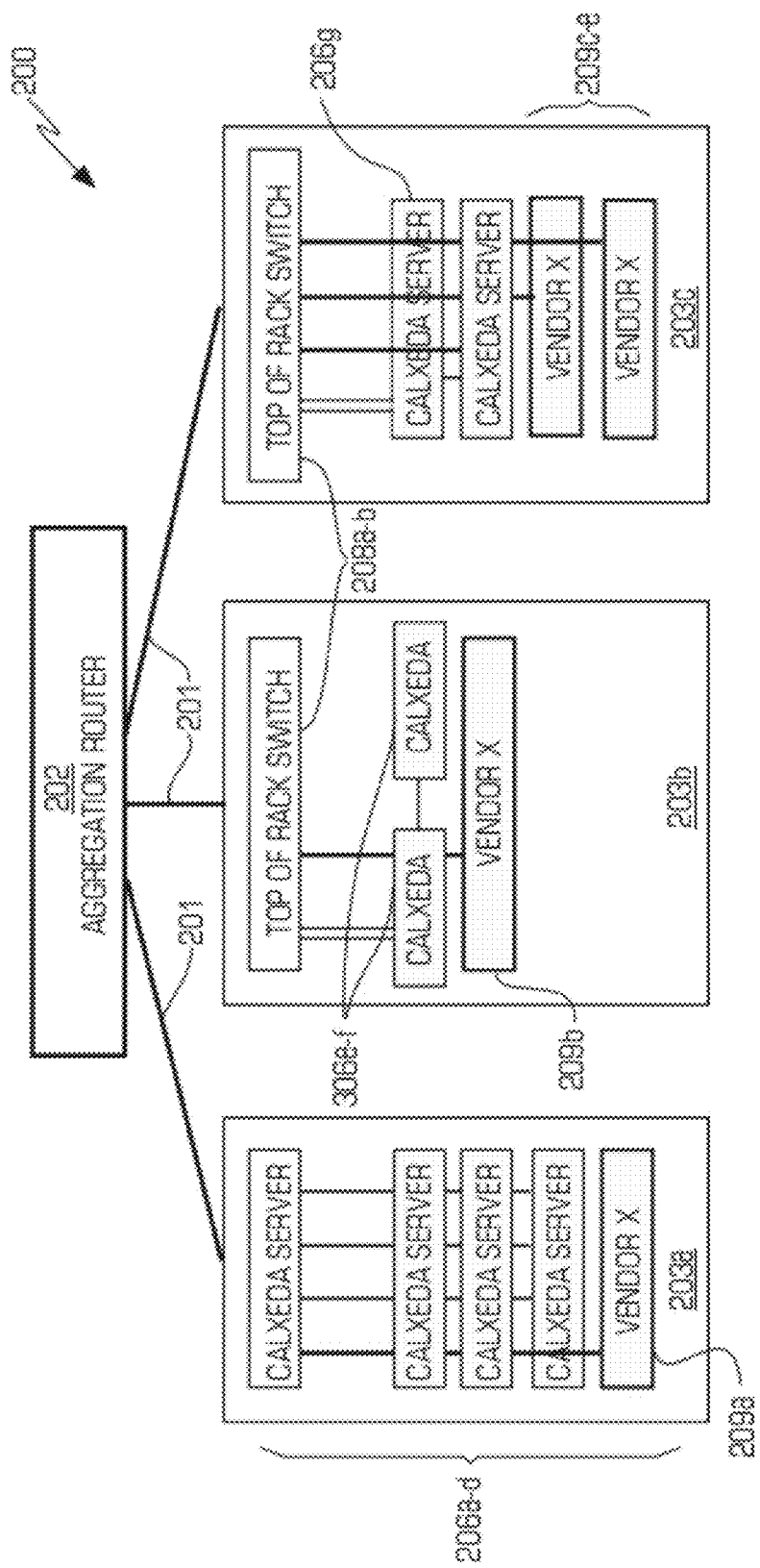
FIG. 3 illustrates a network aggregation using a server in accordance with one embodiment.

FIG. 3 shows a network aggregation 200. This network supports 10-Gb/sec Ethernet communication 201 (thick lines) between aggregation router 202 and three racks 203a-c. In rack 203a the Calxeda interconnect fabric provides multiple high-speed 10 Gb paths, represented by thick lines, between servers 206a-d on shelves within a rack. The embedded switch in servers 206a-d can replace a top-of-rack switch, thus saving a dramatic amount of power and cost, while still providing a 10 Gb Ethernet port to the aggregation router. The Calxeda switching fabric can integrate traditional Ethernet (1 Gb or 10 Gb) into the Calxeda XAUI fabric, and the Calxeda servers can act as a top of rack switch for third-party Ethernet connected servers.

Middle rack 203b shows another scenario where Calxeda servers 206e,f can integrate into existing data center racks that contain a top-of-rack switch 208a. In this case, the IT group can continue to have their other servers connected via 1 Gb Ethernet up to the existing top-of-rack switch. Calxeda internal servers can be connected via Calxeda 10 Gb XAUI fabric, and they can integrate up to the existing top-of-rack switch with either a 1 Gb or 10 Gb Ethernet interconnect. Rack 203c, on the right, is the current way that data center racks are traditionally deployed. The thin red lines represent 1 Gb Ethernet. So, the current deployments of data center racks is traditionally 1 Gb Ethernet up to the top-of-rack switch 308b, and then 10 Gb (thick red line 201) out from the top of rack switch to the aggregation router. Note that all servers are present in an unknown quantity, while they are pictured here in finite quantities for purposes of clarity and simplicity. Also, using the enhanced Calxeda servers, no additional routers are needed, as they operate their own XAUI switching fabric, discussed below.

Figure 4:
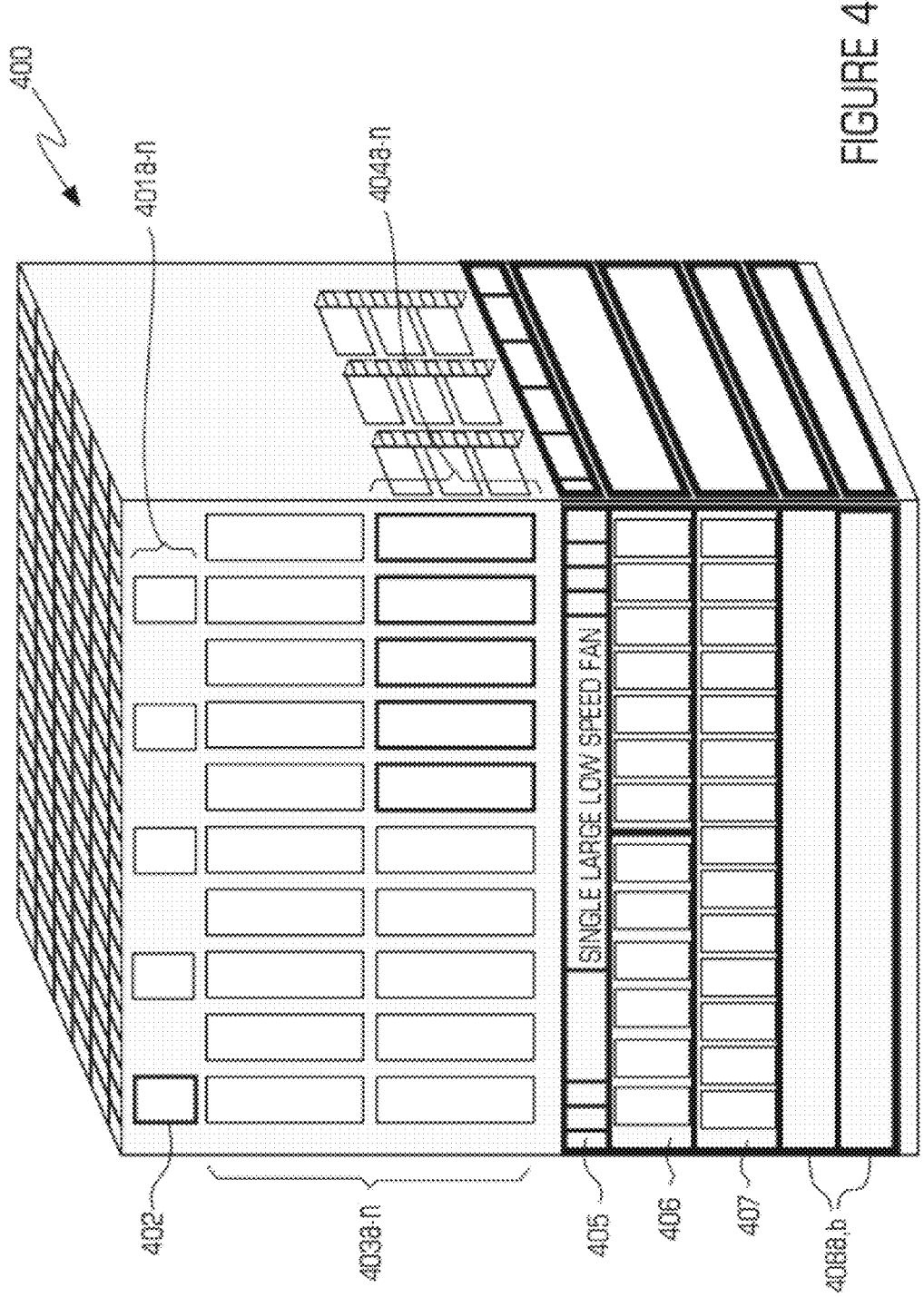
FIG. 4 illustrates a data center in a rack according to one embodiment.

FIG. 4 shows an overview of an exemplary "data center in a rack" 400, according to one embodiment. It has 10-Gb Ethernet PHY 401a-n and 1-Gb private Ethernet PHY 402. Large computers (power servers) 403a-n support search; data mining; indexing; Hadoop, a Java software framework; MapReduce, a software framework introduced by Google to support distributed computing on large data sets on clusters of computers; cloud applications; etc. Computers (servers) 404a-n with local flash and/or solid-state disk (SSD) support search, MySQL, CDN, software-as-a-service (SaaS), cloud applications, etc. A single, large, slow-speed fan 405 augments the convection cooling of the vertically mounted servers above it. Data center 400 has an array 406 of hard disks, e.g., in a Just a Bunch of Disks (JBOD) configuration, and, optionally, Calxeda servers in a disk form factor (the green boxes in arrays 406 and 407), optionally acting as disk controllers. Hard disk servers or Calxeda disk servers may be used for web servers, user applications, and cloud applications, etc. Also shown are an array 407 of storage servers and historic servers 408a, b (any size, any vendor) with standard Ethernet interfaces for legacy applications.

Figure 5:
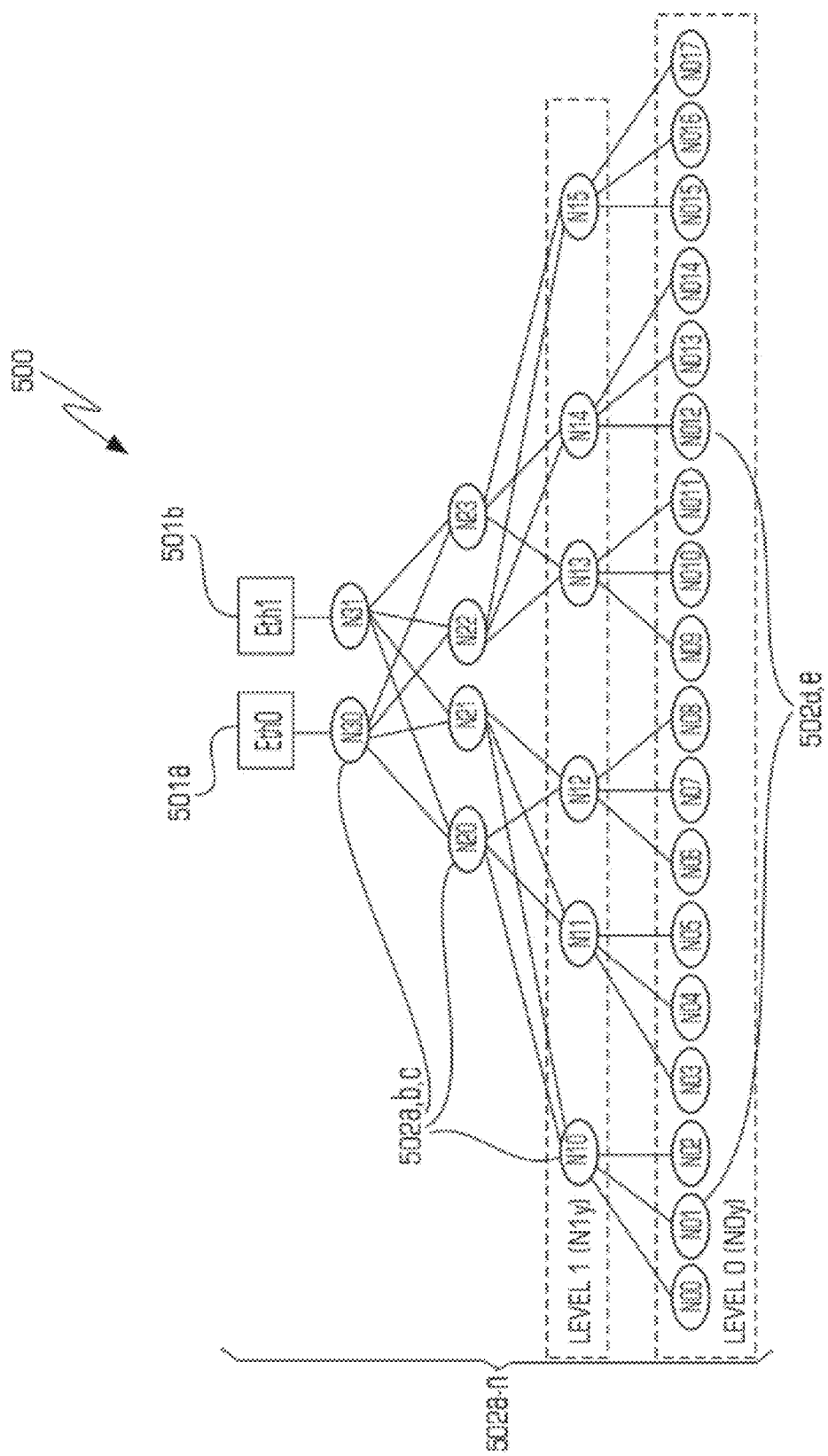
FIG. 5 shows a high level topology of a network system with a switching fabric.

FIG. 5 shows a high-level topology 500 of the network system described in co-pending patent application Ser. No. 12/794,996 that illustrates XAUI connected SoC nodes connected by the switching fabric. The 10 Gb Ethernet ports Eth0 501a and Eth1 501b come from the top of the tree. Ovals 502a-n are Calxeda nodes that comprise both computational processors as well as the embedded switch. The nodes have five XAUI links connected to the internal switch.

The switching layers use all five XAUI links for switching. Level 0 leaf nodes 502d, e (i.e., N0n nodes, or Nxy, where x=level and y=item number) only use one XAUI link to attach to the interconnect, leaving four high-speed ports that can be used as XAUI, 10 Gb Ethernet, PCIe, SATA, etc., for attachment to I/O. The vast majority of trees and fat trees have active nodes only as leaf nodes, and the other nodes are pure switching nodes. This approach makes routing much more straightforward. Topology 500 has the flexibility to permit every node to be a combination computational and switch node, or just a switch node. Most tree-type implementations have I/O on the leaf nodes, but topology 500 let the I/O be on any node. In general, placing the Ethernet at the top of the tree minimizes the average number of hops to the Ethernet.

Building Power Optimized Server Fabric Boards Using Tiled Building Blocks

FIG. 6 illustrates a server board that composes multiple server nodes interconnected with the described point-to-point interconnect. The server board has:

Each of the ovals in this diagram is a standalone server node that includes processor, memory, I/O, and the fabric switch.

The fabric switch has the ability to dynamically modify the width (number of lanes) and speed of each lane for each link independently.

The 14 node board example shows two Ethernet escapes from the fabric. These Ethernet escapes would usually be routed to a standard Ethernet switch or router. These Ethernet escapes can be either standard 1 Gb or 10 Gb Ethernet.

The 14 node example topology is a butterfly fat tree which provides redundant paths to allow adaptive routing to both route around faults and route around localized hot spots.

The 3 node aggregator board allows the composition of large server fabrics with only two board tiles.

For redundancy, add 2nd aggregator

In/Out:
  PCIe connector for smooth-stone fabric
  Optionally Ethernet support (Off, 1, 2, 5, 10 or 20 Gbs)
  Ethernet decision based on bandwidth required for application The nodes on the aggregator board can be either just switching nodes, or full computational nodes including switching.

The board in/out may be PCIe connector that supports two x4 XAUI (2 smooth-stone fabric link) and/or optional Ethernet support (Off, 1, 2, 10 or 20 Gbs).

Example fabric topologies like the 14-node example minimize the number of links that span off the board to minimize connectors (size and number) and associated costs, while still retaining Ethernet escapes and multipath redundancy.

Two aggregator boards can be used to achieve path redundancy when extending the fabric.

Power savings can be achieved with static link configuration
  Lower layer nodes in the figure (noted as Leaf Nodes) can be run at 1 Gb/sec.
  1st layer switching nodes in the figure (noted as Layer 1 Switches) would then have an incoming bandwidth from the Leaf Nodes of 3 Gb/sec. This allows a static link configuration between the Layer 1 and Layer 2 switches of either 2.5 or 5 Gb/sec.

The links extending off the Layer 2 Switches layer can then run at 10 Gb/sec.

In this topology, since the bulk of the nodes are Leaf Nodes, the bulk of the links are running at the slowest rate (1 Gb/sec in this example), thus minimizing networking power consumption.

Allows Ethernet escapes to be pulled at any node in the fabric allowing fabric designers to trade off needed bandwidth of the Ethernet escapes, the number of ports utilized by top of rack switches, and the costs and power associated with the Ethernet ports.

Power savings can be further optimized via dynamic link configuration driven by link utilization. In this example, each link and associated port of the fabric switch contains bandwidth counters, with configurable threshold events that allow for the reconfiguration of the link width and speed, both up and down, based upon the dynamic link utilization.

Since in many common server use cases, the Ethernet traffic is primarily node to external Ethernet and not node to node, the proposed tree fabric structure, and specifically the butterfly fat tree example, minimizes the number of hops across the fabric to Ethernet, thus minimizing latency. This allows the creation of large low latency fabrics to Ethernet while utilizing switches that have a relatively small (in this example 5) number of switching ports.

Figure 1:
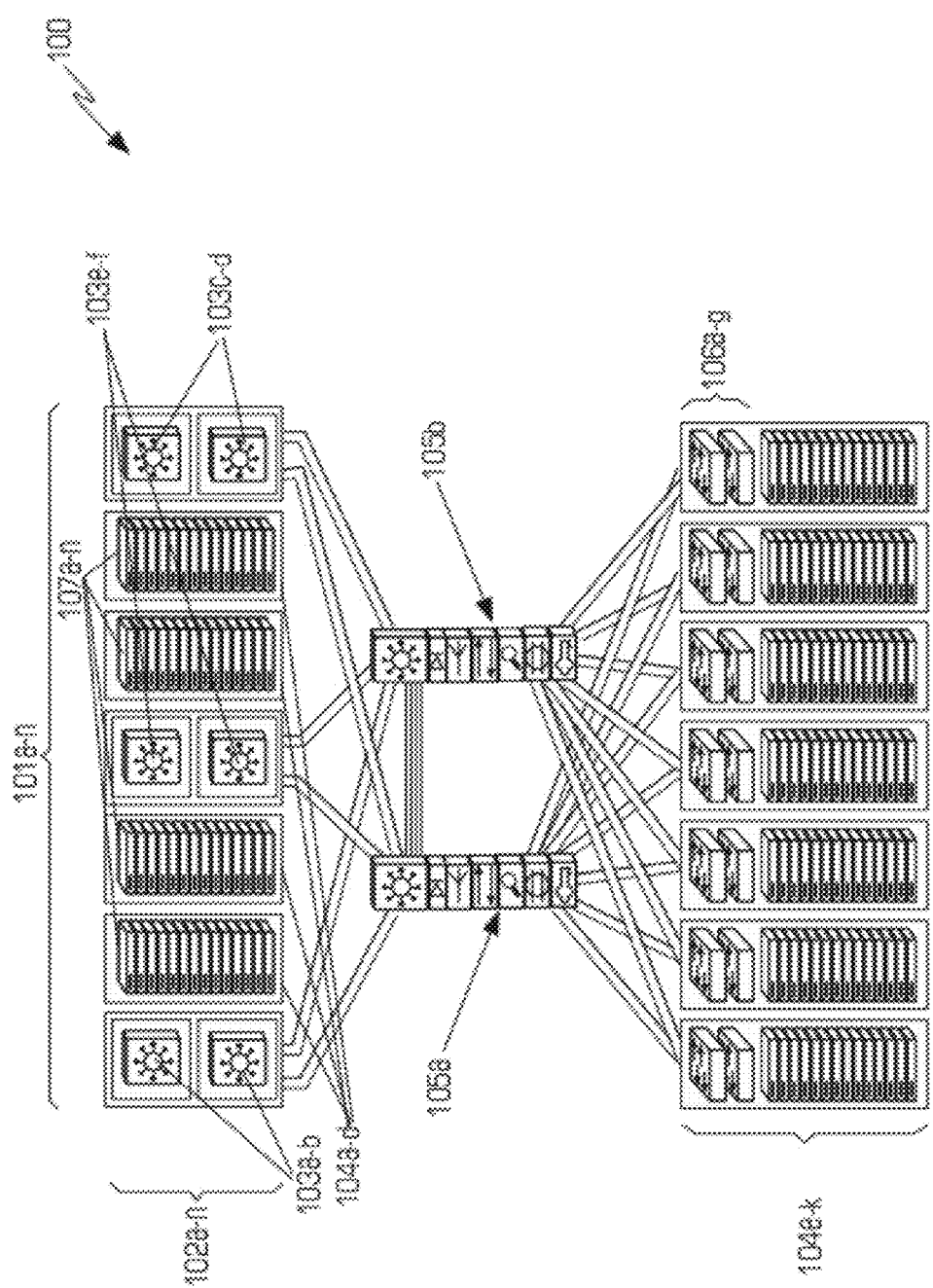
FIGS. 1 and 2 illustrate a typical data center network aggregation.
Figure 2:
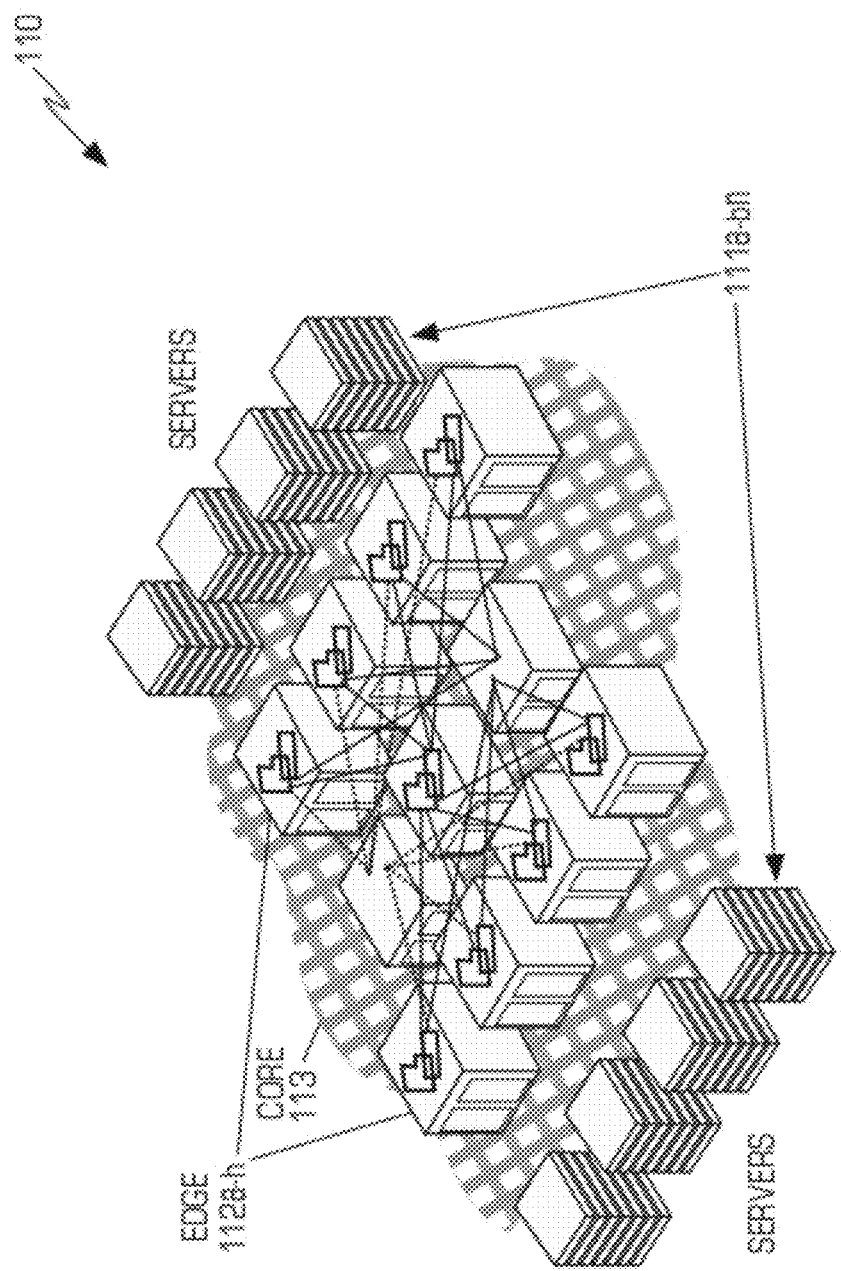

The integration of server 209a in FIG. 2 illustrates another novel system use of the defined server fabric. In this case, to take advantage of the performance and power management of the server fabric, and to minimize port utilization on the top of rack switch, this figure shows a heterogeneous integration of existing servers onto the defined server fabric such that Ethernet traffic from existing servers can be gateway'ed into the fabric, allowing communication with nodes within the fabric, as well as having 209a Ethernet traffic carried through the fabric to the uplink Ethernet port 201.

Figure 6A:
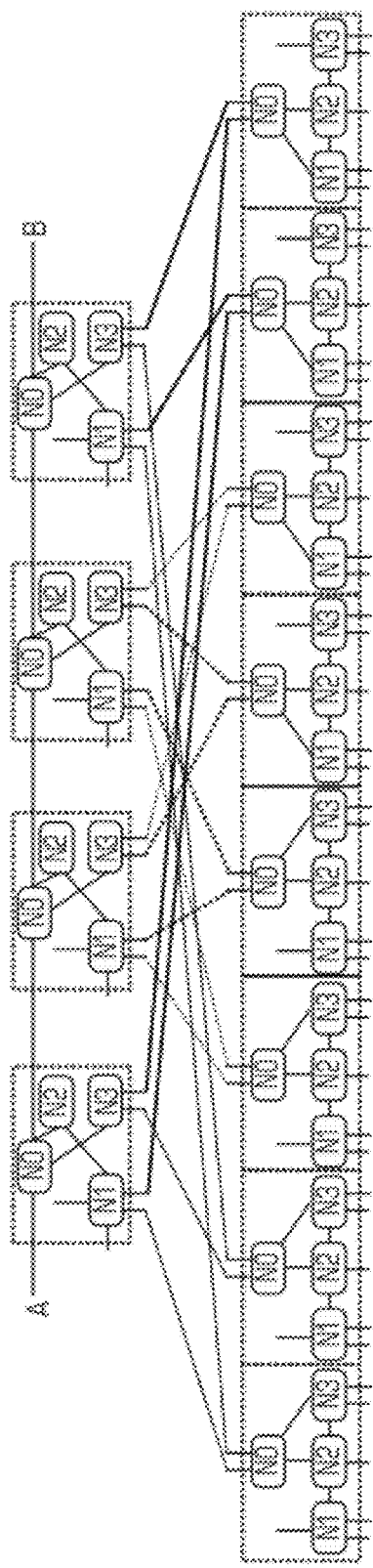
FIGS. 6a-6c illustrates another example of the fabric topology.
Figure 6B:
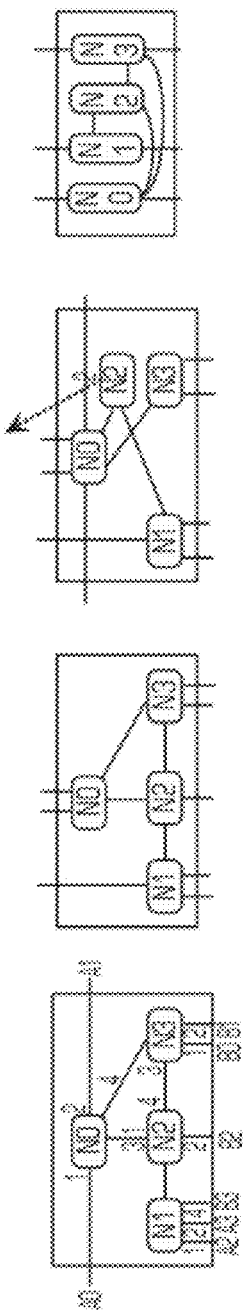
Figure 6C:
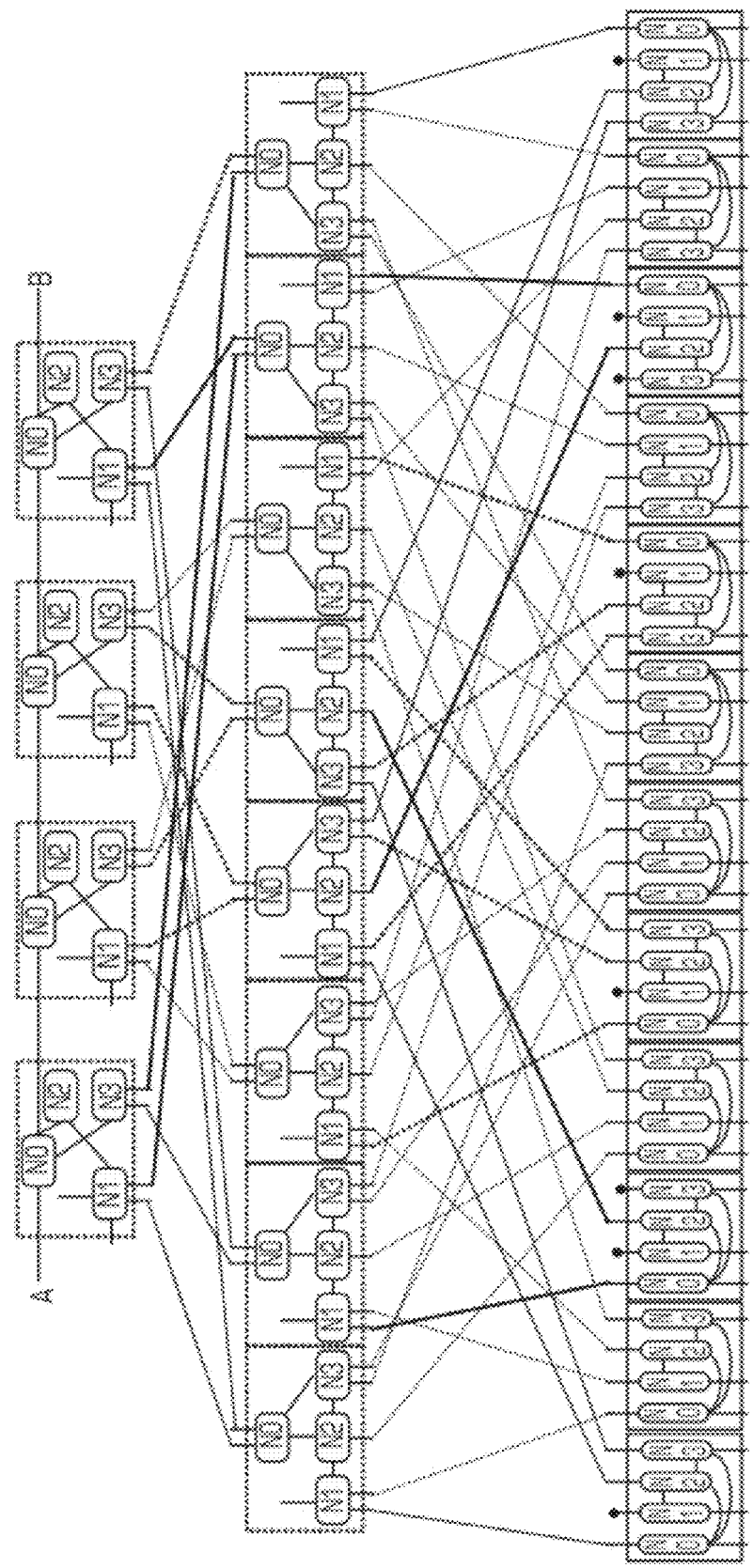

FIGS. 6a-6c illustrates another example of the fabric topology that is a forty eight node fabric topology that consists of 12 cards, where each card contains 4 nodes, connecting into a system board. This topology provides some redundant links are provided, but without heavy redundancy. The topology has four Ethernet gateway escapes and each of these could be either 1 Gb or 10 Gb, but not all of these Ethernet gateways need to be used or connected. In the example shown, eight fabric links are brought off the quad-node card and, in one example, a PCIe x16 connector is used to bring 4 fabric links off the card.

Figure 17:
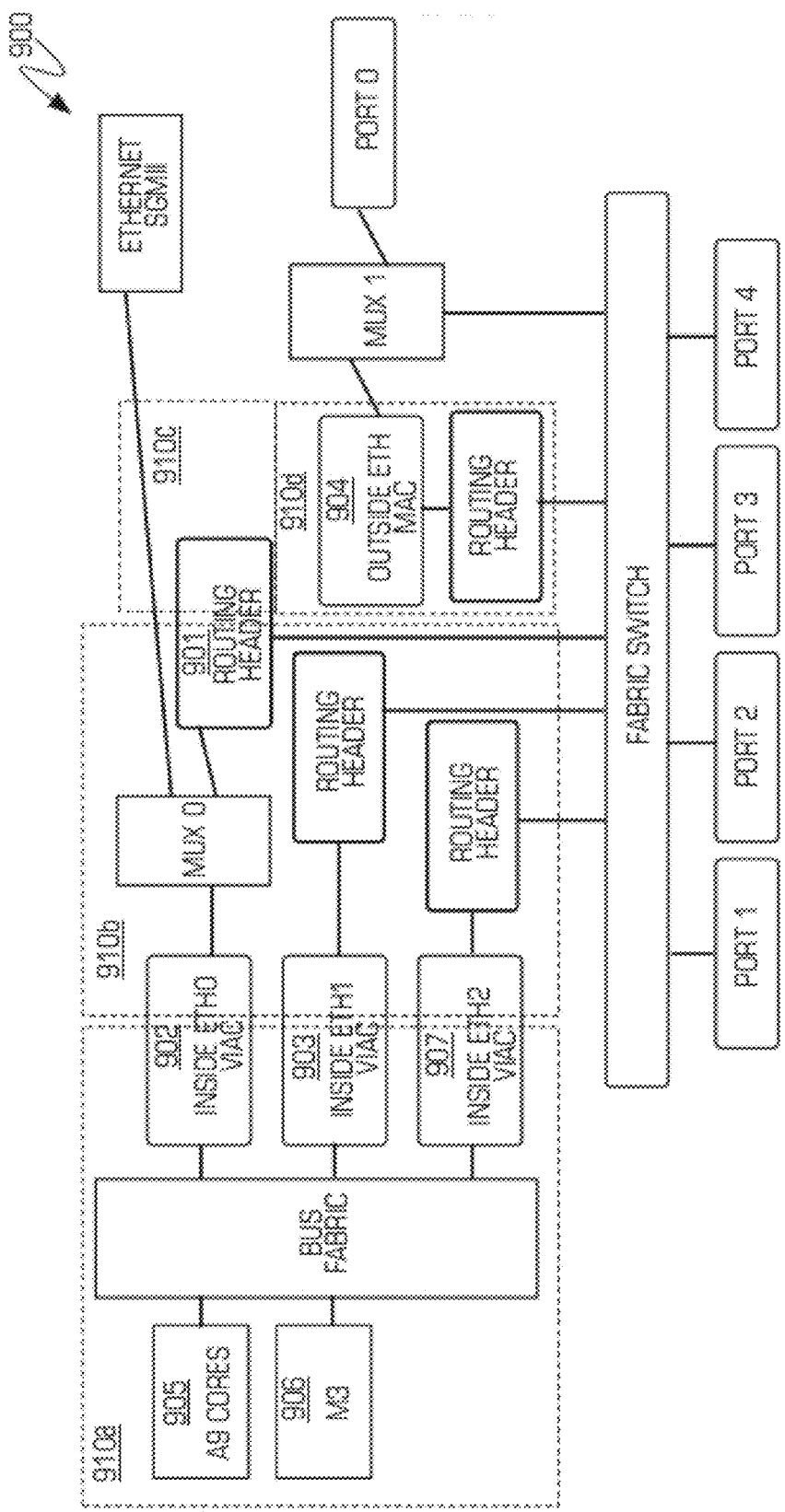
FIG. 17 illustrates the internal architecture of a server node fabric switch.

Summary/Overview of Building Power Optimized Server Fabric Boards Using Tiled Building Blocks 1. A server tree fabric that allows an arbitrary number of Ethernet escapes across a server interconnect fabric, to minimize the number of Ethernet Phys utilized to save power and costs associated with the Ethernet Phys, associated cables, and ports consumed on top of rack Ethernet switches/routers.
2. The switching nodes can be either pure switching nodes saving power by turning off computational subsystems, or can be used as complete computational subsystems including fabric switching. Referring to FIG. 17, in one implementation, multiple power domains are used separate the computational subsystem, block 905, from the management processor, block 906, and the fabric switch, the remainder of the blocks. This allows the SOC to be configured with the computational subsystem, block 905, powered off, retaining management processing in block 906, and hardware packet switching and routing done by the fabric switch.
3. The Butterfly Fat Tree topology server fabric provides for minimal number of links within a board (saving power and costs), minimal number of links spanning boards (saving power and costs) while allowing for redundant link paths both within and across boards.
4. The proposed base board and aggregator board allows scalable fault-resilient server fabrics to be composed with only two board building blocks.
5. Tree oriented server fabrics, and variants like the example butterfly fat tree, allow for static link width and speed specification that can be determined by the aggregate bandwidth of children nodes of that node, allowing for easy link configuration while minimizing interconnect power.
6. Power savings can be further optimized via dynamic link configuration driven by link utilization. In this example, each link and associated port of the fabric switch contains bandwidth counters, with configurable threshold events that allow for the reconfiguration of the link width and speed, both up and down, based upon the dynamic link utilization.
7. Since in many common server use cases, the Ethernet traffic is primarily node to external Ethernet and not node to node, the proposed tree fabric structure, and specifically the butterfly fat tree example, minimizes the number of hops across the fabric to Ethernet, thus minimizing latency. This allows the creation of large low latency fabrics to Ethernet while utilizing switches that have a relatively small (in this example 5) number of switching ports.
8. Allows heterogenous server integration to the fabric carrying Ethernet traffic from existing servers into and through the defined server communication fabric.

Building Power Optimized Server Shelves and Racks Using Tiled Building Blocks

Figure 7:
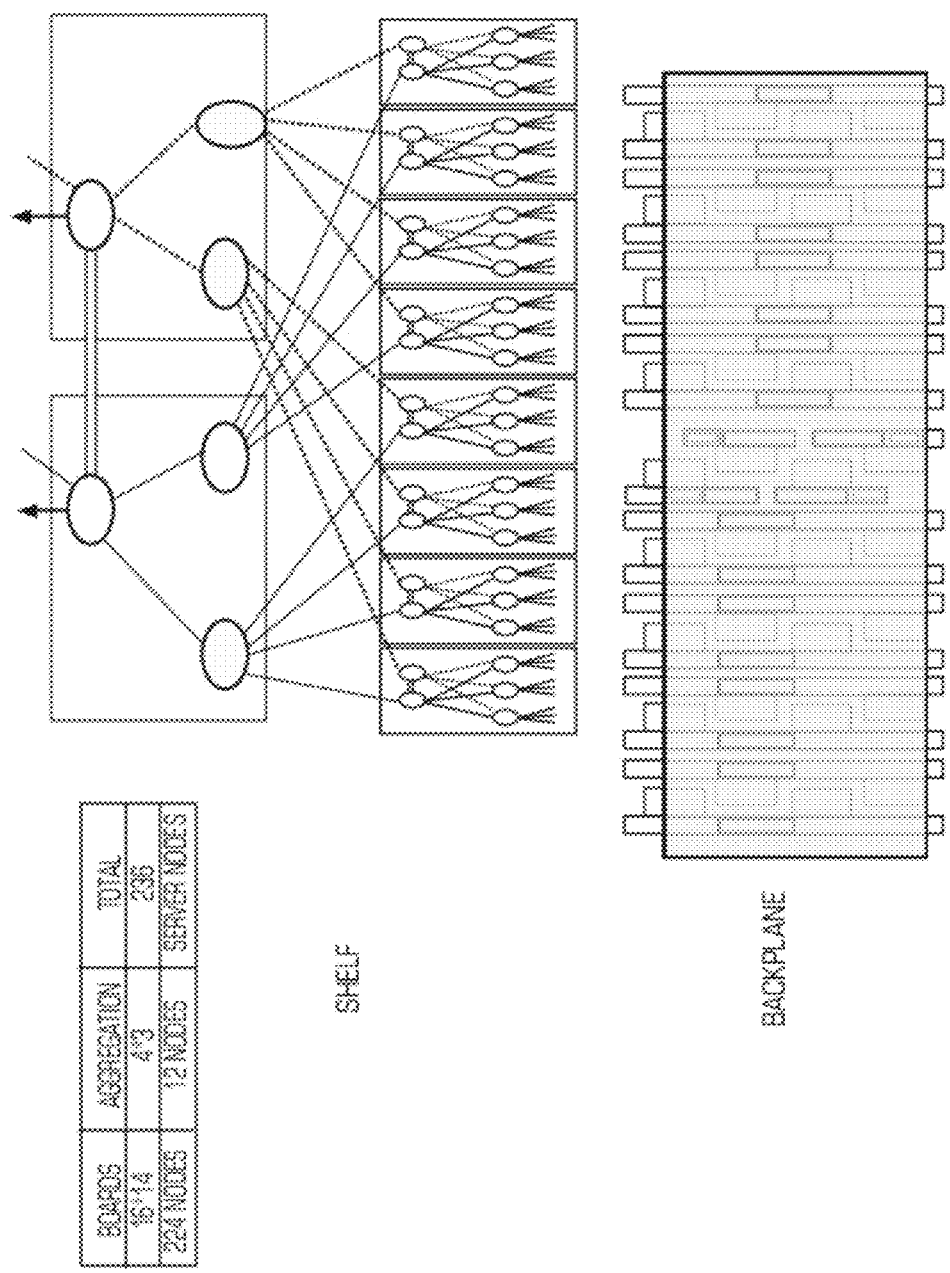
FIG. 7 illustrates an example of a passive backplane connected to one or more node boards and two aggregation boards.

Now these board "tiles" can be composed to construct shelves and racks of fabric connected server nodes. FIG. 7 shows an example of how a passive backplane can connect 8 14-node boards and two aggregation boards to compose a shelf consisting of 236 server nodes. Each board may be, for example, 8.7" tall+mechanical<10.75" for 6 U, interleave heat sinks for density and 16 boards fit in a 19 inch wide rack. The backplane may be simple/cheap with a PCIe connectors and routing wherein the routing may be XAUI signals (blue&green)+Power which is very simple without wires. Ethernet connections shown at 8 board aggregation point.

FIG. 8 shows an example of extending the fabric across shelves, linking shelves across a server rack. The Ethernet escapes can be pulled at any node in the fabric, in this example, they are pulled from the passive interconnect backplane connecting the multi-node blades.

Summary/Overview of Building Power Optimized Server Shelves and Racks Using Tiled Building Blocks 1. Utilization of a PCIe connector to bring out the Ethernet escapes and XAUI links off a board to connect boards together with a point to point server fabric, utilizing not the PCIe signaling, but using the physical connector for the power and XAUI signals of the board, while maintaining redundant communication paths for fail-over and hotspot reduction.
2. XAUI point-to-point server interconnect fabric formed with a fully passive backplane.

3. Ethernet escapes across a fabric spanning the rack at every level of tree, not just at the top of the tree.
4. Ethernet escapes across the fabric can be dynamically enabled and disabled to match bandwidth with optimized power usage.
5. Node to node traffic, including system management traffic stays on the fabric spanning a rack without ever traversing through a top of rack Ethernet switch.

Storage

FIG. 9a shows an exemplary server 700 with a disk form factor, typically such as a standard 2.3-inch or 3.5-inch hard disk drive (HDD) with SCSI or SATA drive, according to one embodiment. Server board 701 fits in the same infrastructure as disk drive 702 in a current disk rack. Server 701 is a full server, with DDR, server-on-a-chip SoC, optional flash, local power management, SATA connections to disks (1-16 . . . limited by connector size). Its output could be Ethernet or Calxeda's fabric (XAUI), with two XAUI outputs for fail-over. Optionally, it could use PCIe instead of SATA (SSDs or other things that need PCIe), with 1 through 4 nodes to balance compute vs. storage needs. Such a server could do RAID implementation as well as LAMP stack server applications. Use of Calxeda ServerNode™ on each disk would offer a full LAMP stack server with 4 GB of DDR3, and multiple SATA interfaces. Optionally, a second node for 8 GB of DDR could be added if needed.

Figure 9C:
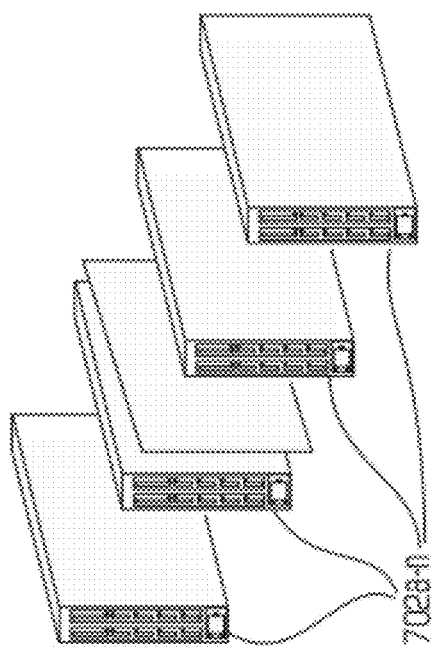
FIGS. 9b and 9c show exemplary arrays of disk-server combination according to one embodiment using a storage server 1-node SATA board.
Figure 9B:
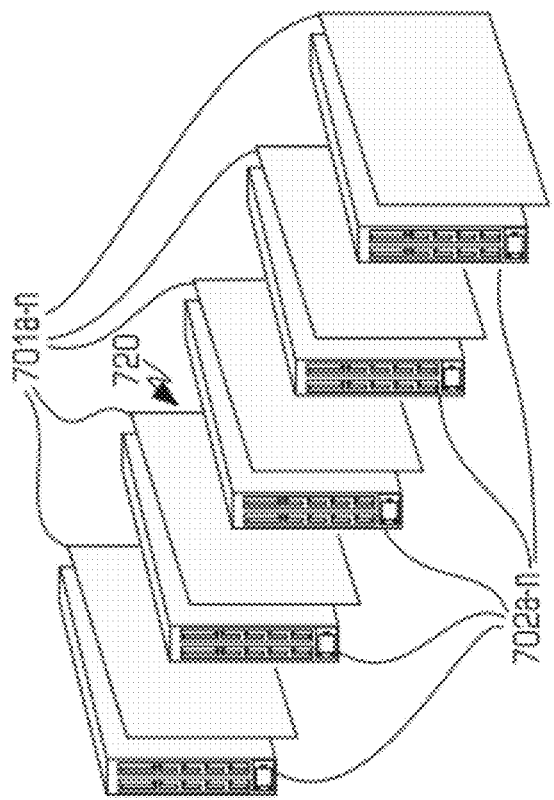

FIGS. 9b and 9c show exemplary arrays 710 and 720, respectively, of disk-server combinations 700a-n, according to one embodiment, using a storage server 1-node SATA board as discussed above. Connection by some high speed network or interconnect, either standard or proprietary, eliminates the need for a large Ethernet switch, saving power, cost, heat and area. Each board 701 is smaller than the height and depth of the disk. The array may be arranged with alternating disks and board, as shown in FIG. 7b, or one board can server multiple disks, for example, in a disk, disk, board, disk, disk arrangement, as shown in FIG. 7c. Thus computing power may be matched to disk ratio in flexible fashion. Connectivity of boards 701a-n may be on a per node basis, with SATA used to hook to disk and multiple SATAs to hook to multiple disks. It may also be on a node to node basis, with two XAUIs in the fabric configuration, as discussed earlier, as well as in application 61/256,723 in each node, for redundancy. Nodes are connected through the XAUI fabric. Such connections could be of a tree or fat-tree topology, i.e., node to node to node to node, with deterministic, oblivious, or adaptive routing moving data in the correct direction. Alternatively, an all-proprietary interconnect could be used, going to other processing units. Some ports could go to an Ethernet output or any other I/O conduit. Each node could go directly to Ethernet, inside the "box," or XAUI to an XAUI aggregator (switch) then to PHY, or XAUI to PHY. Or any combination of the above could be used. In yet other cases, SATA connections could be replaced with PCIe connections, using SSDs with PCIe connections. Some SSDs are going into disk form factors with PCIe or SATA. Or PCIe and SATA could be mixed. Ethernet out of the box could be used instead of XAUI for system interconnection. In some cases, for example, standard SATA connectors may be used, but in other cases higher-density connectors with proprietary wiring through a proprietary backplane could be made.

In yet another case, a server function could be within a disk drive, offering a full server plus a disk in a single disk drive form factor. For example, the ServerNode™ could be put on the board inside a disk. This approach could be implemented with XAUI or Ethernet connectivity. In such a case, a server-on-a-chip approach known to the inventor could be used as a disk controller plus server. FIG. 9d illustrates this concept. A standard 3.5 inch drive is shown in FIG. 9d, item 9d0. It has an integrated circuit card 9d1 that controls the disk drive. A significant amount of space is unused within the drive, noted by 9d2 in which the Calxeda low-power, small server node PCB can be formed to fit within this unused space within the disk drive.

Figure 9E:
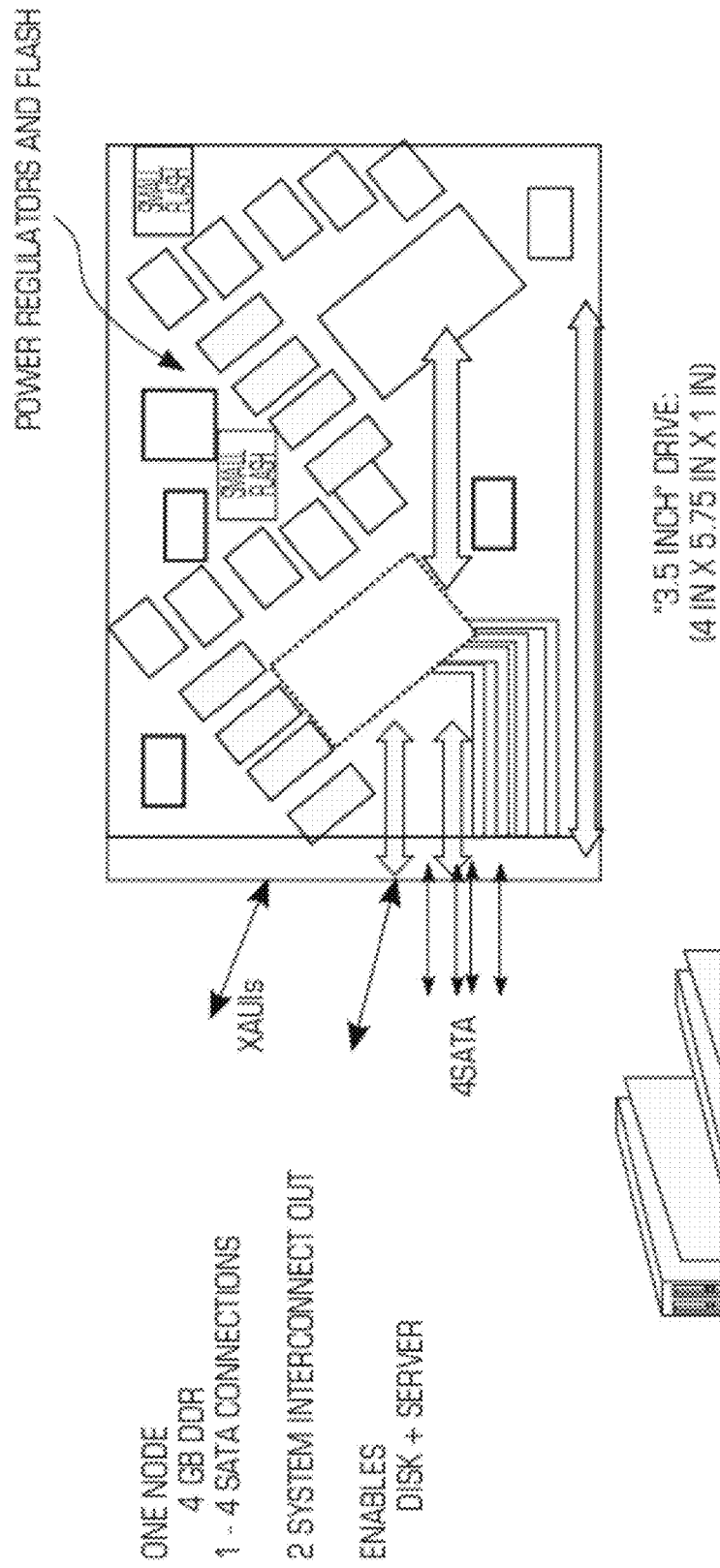
FIG. 9e illustrates an implementation of multiple server nodes in a standard 3.5 inch disk drive form factor.

FIG. 9e illustrates an implementation of putting multiple server nodes in a standard 3.5 inch disk drive form factor. In this case, connectors from the server PCB to the backplane exports the XAUI based server fabric interconnect to provide network and inter-server communication fabric, as well as 4 SATA ports for connection to adjacent SATA drives.

Figure 10:
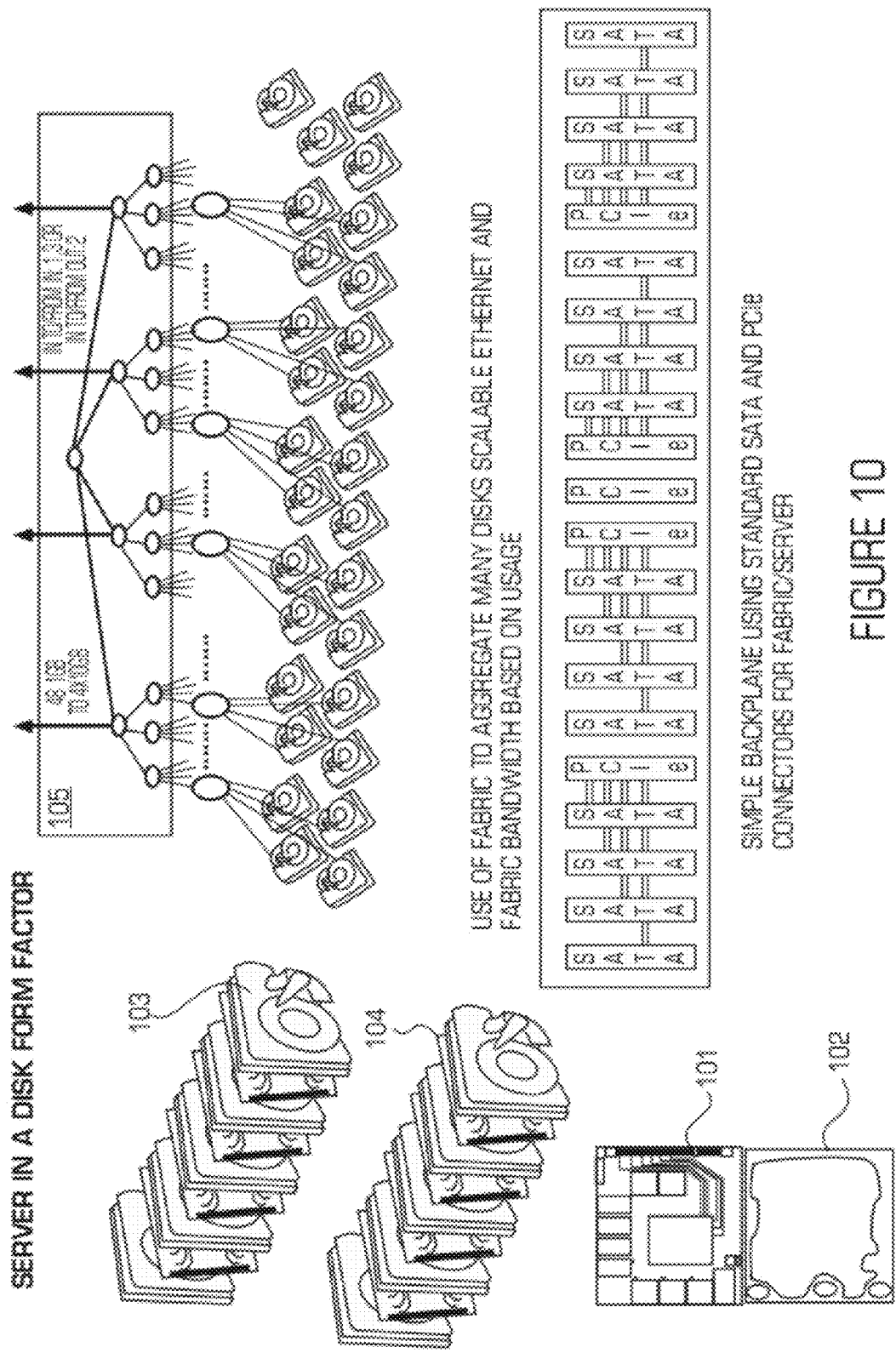
FIG. 10 illustrates an implementation of deeply integrated servers with storage.

FIG. 10 illustrates an implementation for deeply integrating servers with storage. Server node (101) shows a complete low-power server that integrates computational cores, DRAM, integrated I/O, and the fabric switch. In this example, server node 101 is shown in the same form factor as a standard 2½ inch disk drive (102). (103) illustrates combining these server nodes and disk drives in a paired one-to-one fashion, where each server node has it's own local storage. (104) shows the server node controlling 4 disk drives. System (105) illustrates combining these storage servers via the unifying server fabric, and then in this example pulling four 10-Gb/sec Ethernet escapes from the fabric to connect to an Ethernet switch or router.

Figure 11:
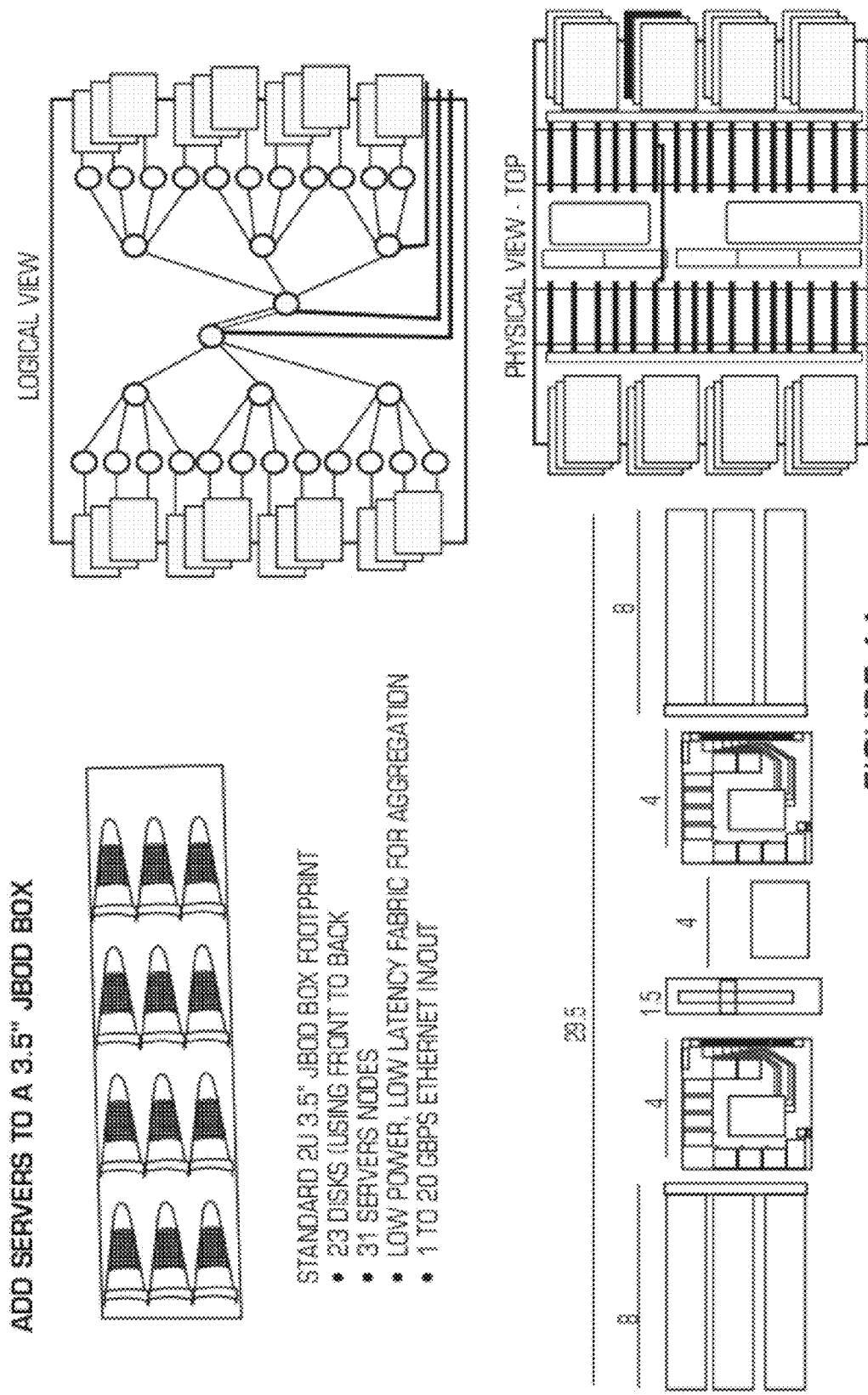
FIG. 11 illustrates an implementation of a dense packing of storage and servers leveraging an existing 3.5 inch JBOD storage box.

FIG. 11 illustrates a concrete realization of this dense packing of storage and servers by illustrating a usage leveraging an existing 3.5 inch JBOD (Just a Bunch of Disks) storage box. In this case the JBOD mechanicals including disk housing is unchanged, but storage nodes are shown paired one-to-one with disk drives within the unmodified JBOD box. This illustrates a concept where the server nodes are pluggable modules that plug into an underlying motherboard that contains the fabric links. In this illustration, this standard JBOD box houses 23 3.5 inch disks (shown as rectangles in the logical view), and this figure shows 31 server nodes (shown as ovals/circles in the logical view) contained within the JBOD box controlling the 23 disks, and exposing two 10 Gb/sec Ethernet links (shown as dark wide lines in the logical view). This tightly integrated server/storage concept takes an off-the-shelf storage only JBOD box, and then adds 31 server nodes in the same form factor communicating over the power optimized fabric. This maps very well to applications that prefer to have local storage.

Figure 12:
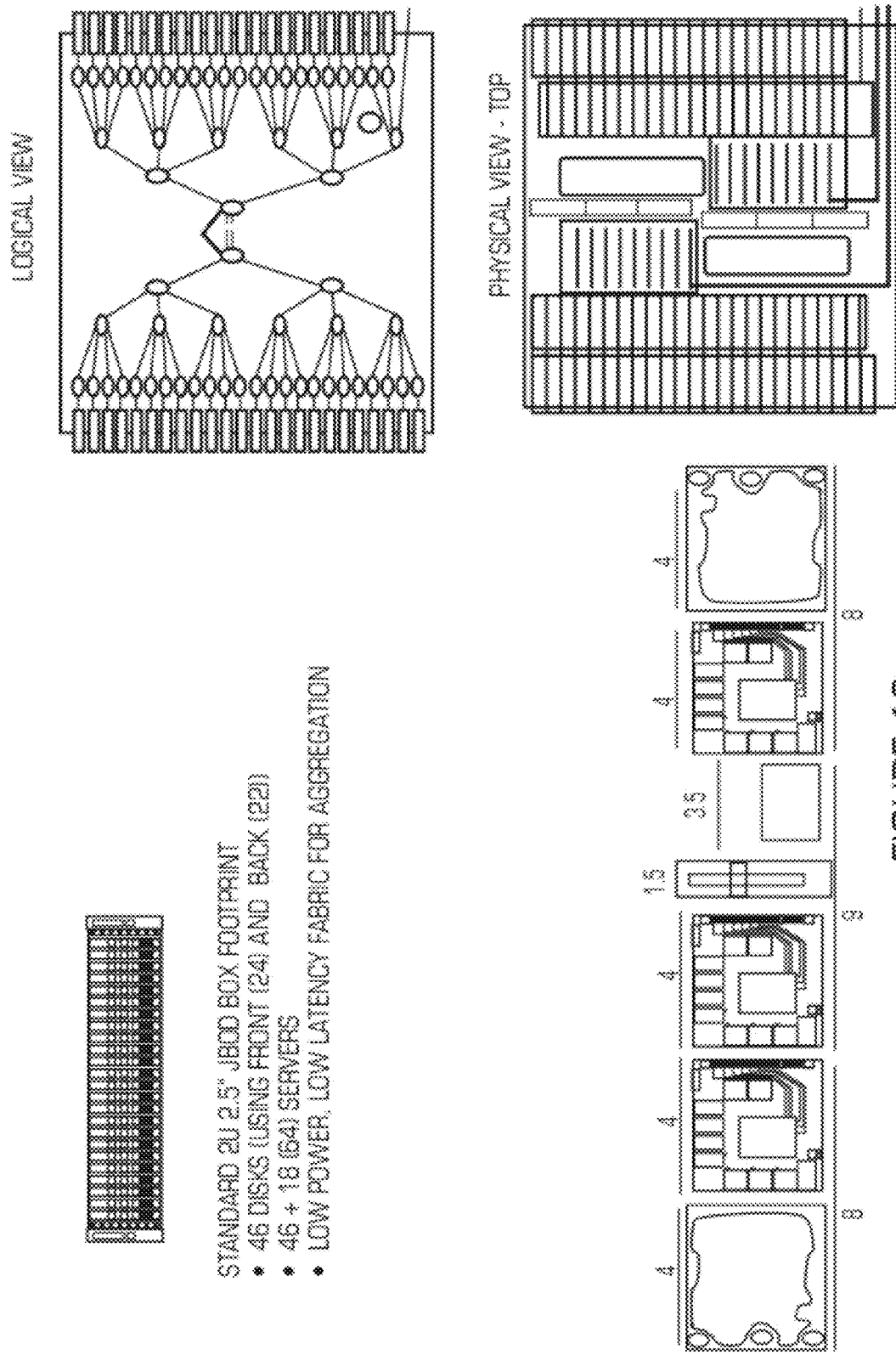
FIG. 12 illustrates an implementation of a server node instanced in the same form factor of a 2.5 inch drive.

FIG. 12 shows a related concept that leverages the fact that the server nodes can be instanced in the same form factor of a 2.5 inch drive. In this case, they are integrated into a 2.5 inch JBOD that has 46 disks. This concept shows 64 server nodes integrated in the same form factor of the JBOD storage. In this example, two 10 Gb Ethernet links are pulled from the fabric, as well as a 1 Gb/sec management Ethernet link.

Summary/Overview of Storage
1. Utilization of a PCIe connector to bring out the Ethernet escapes and XAUI links off a board to connect boards together with a point to point server fabric, utilizing not the PCIe signaling, but using the physical connector for the power and XAUI signals of the board, while maintaining redundant communication paths for fault resilience and load balancing.
2. Utilization of the defined server fabric to transform existing JBOD storage systems by pairing small form-factor low-power fabric-enabled server nodes with the disks providing very high-density compute servers, tightly paired with local storage, integrated via the power and performance optimized server fabric to create new high-performance computational server and storage server solutions without impact the physical and mechanical design of the JBOD storage system.

3. For use in a high density computing system, a method of encapsulating complete servers in the form factors of hard disk drives, for the purposes of replacing some of the drives with additional servers.
4. As in claim 3, wherein the servers are connected via and additional switching fabric to a network
5. As in claim 3, wherein the backplane in the enclosure holding the drives is replaced with a backplane suitable for creating at least one internal switching pathway.
6. For use in a high-density storage system, a method of integrating a low-power server PCB into the empty space within a standard 3.5 inch disk drive, providing integrated compute capabilities within the disk drive.

Cooling of Rack Integrated Low-Power Servers

One aspect of driving to low-power computer server solutions is the management of heat, cooling, and air movement through the rack and across the boards. Minimization of fans is one aspect of lowering total cost of ownership (TCO) of low-power servers. Fans add cost, complexity, reduce reliability due to the moving parts, consume a significant amount of power, and produce a significant amount of noise. Reduction and removal of fans can provide significant benefits in reliability, TCO, and power consumption.

FIG. 13 illustrates a novel implementation of rack chimney cooling that supports chimney cooling through the entire rack or in just a segment of the rack. An important aspect is the single fan in a chimney rack concept, which uses natural convection upward with help from one fan. A large fan, cooling the entire rack, can be slow speed. It may be positioned at the bottom, or within the rack below the vertically mounted convection cooled subset of the rack. As cool air comes in the bottom, the fan pushes it through the chimney and out the top. Because all boards are vertical, there is no horizontal blockage. Although in this example, the fan is shown at the bottom of the rack, it can be anywhere in the system. That is, the system could have horizontal blocking with "classic" cooling—under the vent and fan—leaving the top as a vertical chimney. This vertical, bottom-cooled approach can work on a small system. The fan can be variable speed and temperature dependent.

Figure 14:
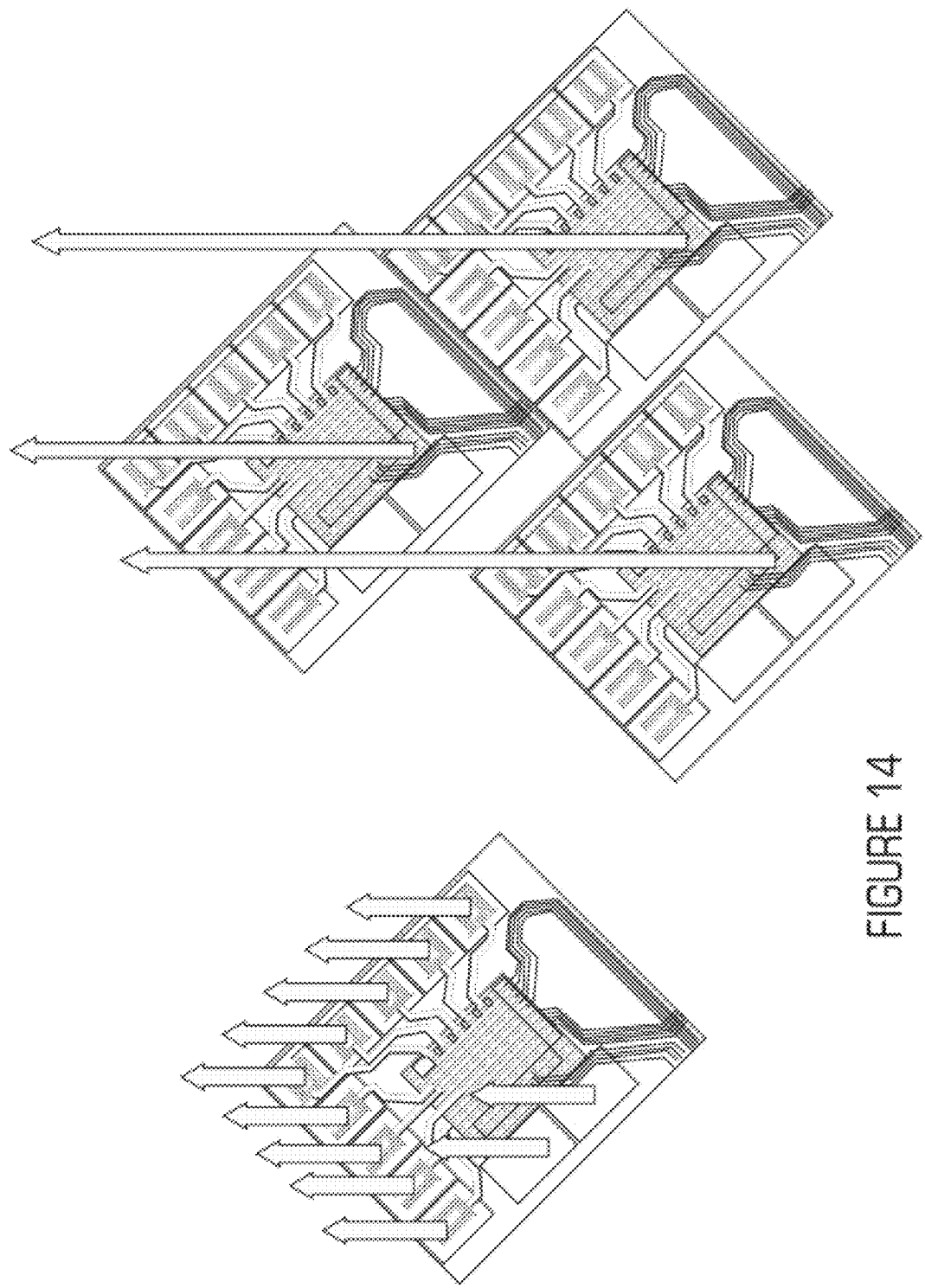
FIG. 14 illustrates server nodes that are placed diagonally with respect to each other to minimize self-heating across server nodes.

FIG. 13*a* shows an exemplary illustration of the novel principles of heat convection 500 used in the chimney rack concept. Placing the components at an angled alignment causes heat streams 501*a-n* to rise from heat-emanating Double Data Rate (DDR) memory chips 503*a-n* on a printed circuit board 502, so those heat emanating chips don't form heat backup or mutual heat ups. In this example, the DDR chips are placed diagonally with one another, not stacked vertically, because they tend to heat one another. Also, the DDR chips are placed above, not below, the large computing chips 504*a*, such as ASICs, SOCs, or processors, because they would tend to heat the SOCs. And the coolest chips, the flash chips 506, is placed below the SOCs. Likewise, nodes are not stacked vertically, as discussed below. FIG. 14 extends this concept to show how server nodes are placed diagonally with respect to each other to minimize self-heating across server nodes.

Figure 15:
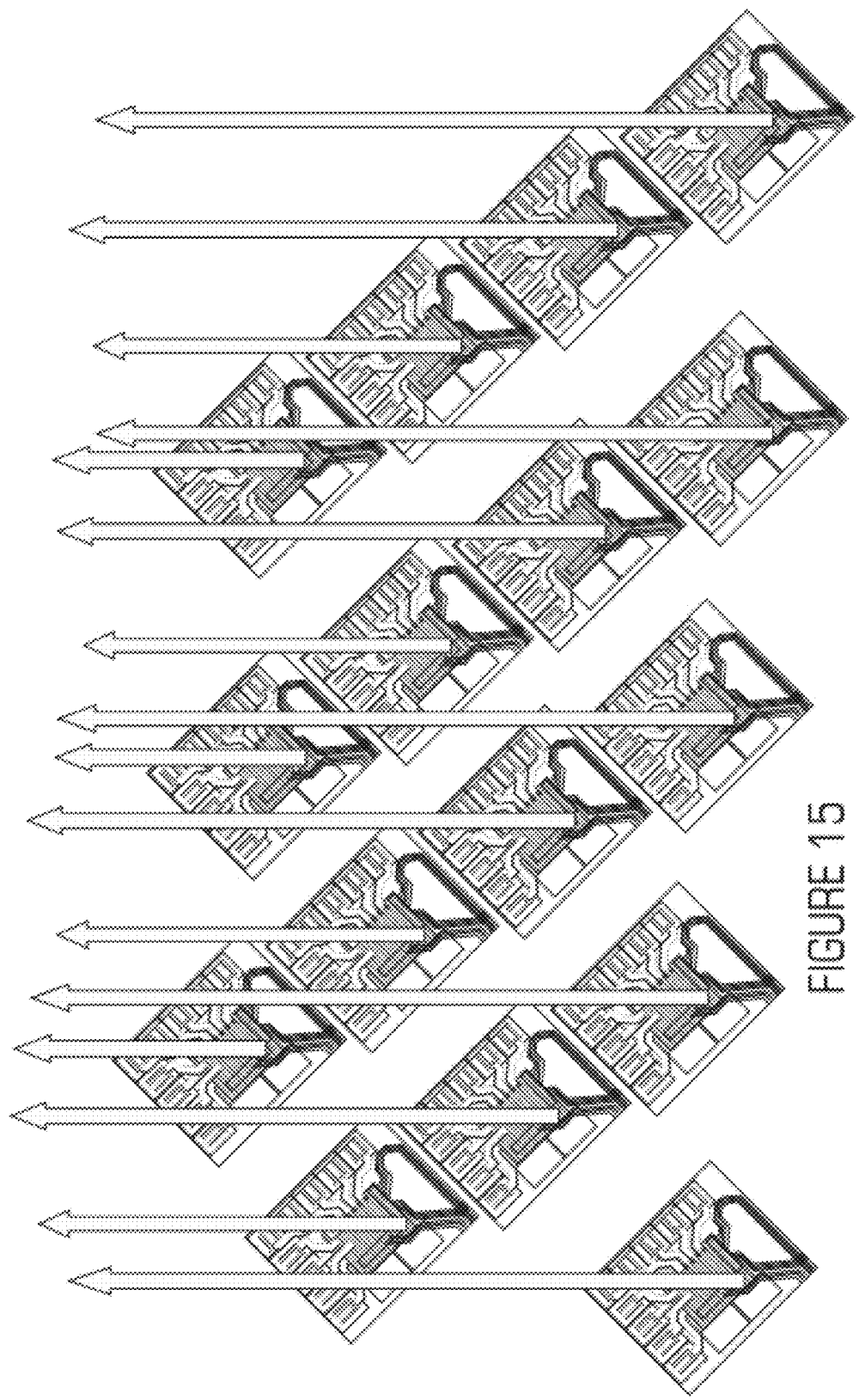
FIG. 15 shows an exemplary 16-node system according to one embodiment with heat waves rising from printed circuit boards.
Figure 16:
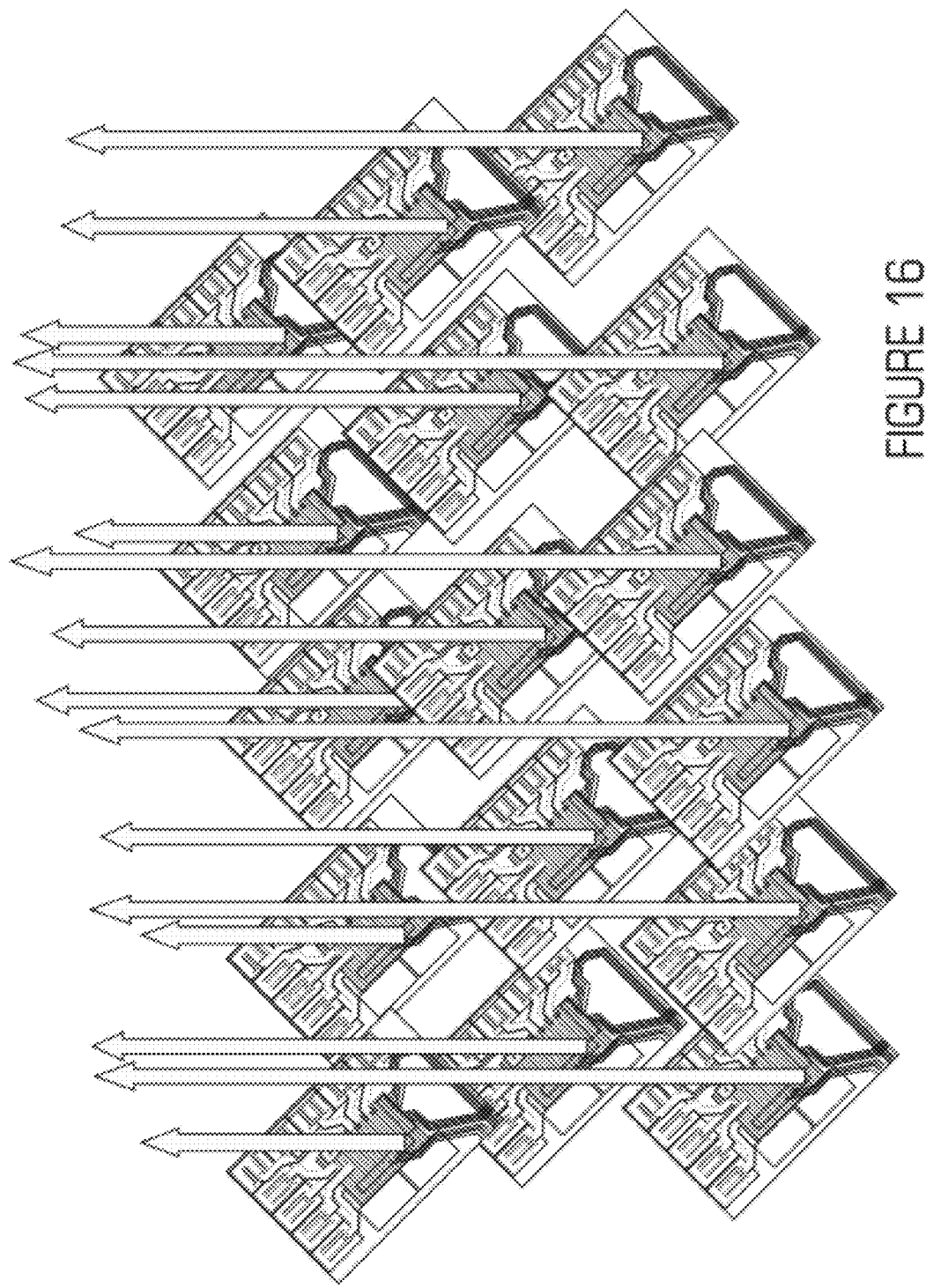
FIG. 16 shows a higher-density variant of the 16-node system with nodes similarly arranged to minimize self-heating across the nodes.

FIG. 15 shows an exemplary 16-node system, according to one embodiment, with heat waves rising from printed circuit boards. For a typical 16-node system, individual are arranged so that the heat rising from each unit does not heat the unit above. The overall enclosure would typically be longer, less tall, and less dense. Also, rather than mount PCBs diagonally as shown, PCBs could be squarely aligned and be rectangular, but components could be placed in a diagonal alignment to minimize mutual heating. PCBs in different rows could either have complementary layouts or could be staggered accordingly to reduce mutual heating. Similarly, FIG. 16 shows a higher-density variant of the 16-node system with nodes similarly arranged to minimize self-heating across the nodes.

An additional cooling concept for racks of low power servers is to use a pneumatic air pressure differential to create an upward air flow, without requiring fans. The technique for doing this is to create an sealed rack with an extended vertical vent pipe for the air. This vent pipe must be tall enough (approximately 20-30 feet+) to create sufficient air pressure differential to create the upward air flow. This provides a totally passive air movement and cooling system for the rack of low power servers.

Summary/Overview of Cooling of Rank Mounted Low Power Servers

1. For use in a high density computing system, a method of placing heat-emanating components on a vertically placed mounting board,
   wherein none of the heat-emanating component is placed directly above or below another heat-emanating component,
2. As claim 1, wherein the components are arranged in a substantially diagonal arrangement across the mounting board
3. As in claim 1, wherein the components are arranged in several substantially cross diagonal arrangements across the mounting board
4. As in claims 1, 2 and 3, wherein the mounting board is a Printed Circuit Board Server Fabric Switching of Non-Ethernet Packets As described in co-pending patent application Ser. No. 12/794,996, FIG. 17 illustrates the internal architecture of a server node fabric switch. FIG. 17 shows a block diagram of an exemplary switch 900 according to one aspect of the system and method disclosed herein. It has four areas of interest 910*a-d*. Area 910*a* corresponds to Ethernet packets between the CPUs and the inside MACs. Area 910*b* corresponds to Ethernet frames at the Ethernet physical interface at the inside MACs, that contains the preamble, start of frame, and inter-frame gap fields. Area 910*c* corresponds to Ethernet frames at the Ethernet physical interface at the outside MAC, that contains the preamble, start of frame, and inter-frame gap fields. Area 910*d* corresponds to Ethernet packets between the processor of routing header 901 and outside MAC 904. This segmented MAC architecture is asymmetric. The inside MACs have the Ethernet physical signaling interface into the routing header processor, and the outside MAC has an Ethernet packet interface into the routing header processor. Thus the MAC IP is re-purposed for inside MACs and outside MACs, and what would normally be the physical signaling for the MAC to feed into the switch is leveraged. MAC configuration is such that the operating system device drivers of A9 cores 905 manage and control inside Eth0 MAC 902 and inside ETH1 MAC 903. The device driver of management processor 906 manages and controls Inside Eth2 MAC 907. Outside Eth MAC 904 is not controlled by a device driver. MAC 904 is configured in Promiscuous mode to pass all frames without any filtering for network monitoring. Initialization of this MAC is coordinated between the hardware instantiation of the MAC and any other necessary management processor initialization. Outside Eth MAC 904 registers are visible to both A9 905 and management processor 906 address maps. Interrupts for Outside Eth MAC 904 are routable to either the A9 or management processor.

It is key to node that the Routing Header processor 910*d* adds a fabric routing header to the packet when packets are received from a MAC headed to the switch, and removes the fabric routing header when the packet is received from the switch heading to a MAC. The fabric switch itself only routes on node IDs, and other information, contained in the fabric routing header, and does no packet inspection of the original packet.

Distributed PCIe Fabric

Figure 18:
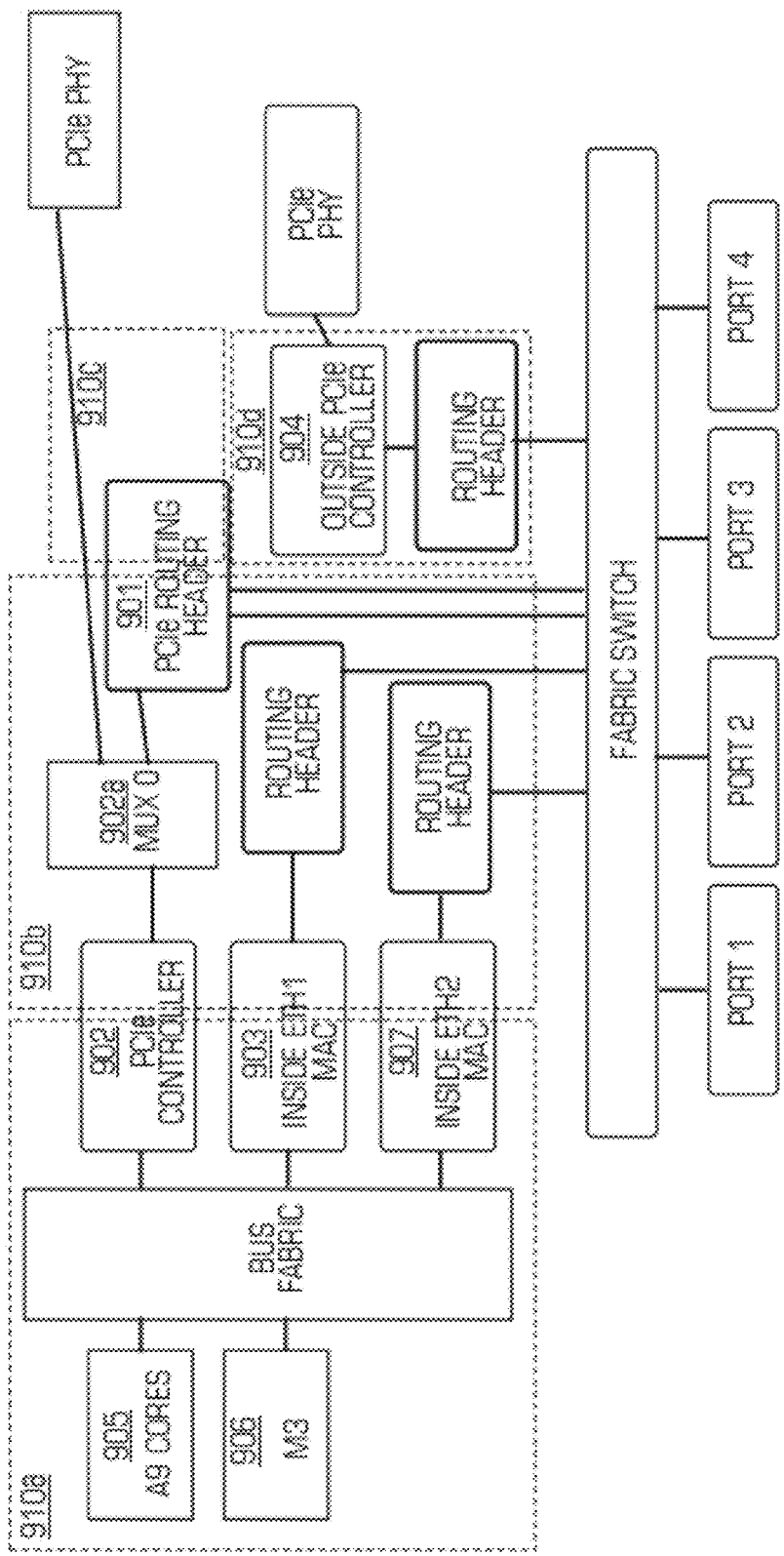
FIG. 18 illustrates a server node that includes a PCIe controller connected to the internal CPU bus fabric.

FIG. 18 illustrates a server node that includes a PCIe controller connected to the internal CPU bus fabric. This allows for the creation of a novel PCIe switching fabric that leverages the high performance, power optimized server fabric to create a scalable, high-performance, power optimized PCIe fabric.

The technique follows:

PCIe controller 902 connects to Mux 902*a* allowing the PCIe controller to connect directly to the external PCIe Phy, or to the PCIe Routing Header Processor 910*c*. When Mux 902*a* is configured to direct PCIe traffic to the local PCIe Phy, this is equivalent to the standard local PCIe connection. When Mux 902*a* is configured to direct PCIe traffic to the PCIe Routing Header Processor 910*c*, this enables the novel PCIe distributed fabric switch mechanism.

PCIe Routing Header Processor 910*c* utilizes the embedded routing information within the packet (address, ID, or implicit) to create the fabric routing header that maps that PCIe packet route to the destination fabric node PCIe controller.

This provides similar advantages to the distributed PCIe fabric that the server fabric provides to networking.

PCIe transactions sourced from the processor cores (905) can be routed to local PCIe Phy (via either the Mux bypass or via the switch), can be routed to any other node on the fabric, directly to the inside PCIe controller (902) or to the outside PCIe controller/Phy (904).

Likewise, incoming PCIe transactions enter the outside PCIe controller (904), get tagged with the fabric routing header by the PCIe Routing Header Processor (910), and then the fabric transports the PCIe packet to its final target.

Distributed Bus Protocol Fabric

Figure 18A:
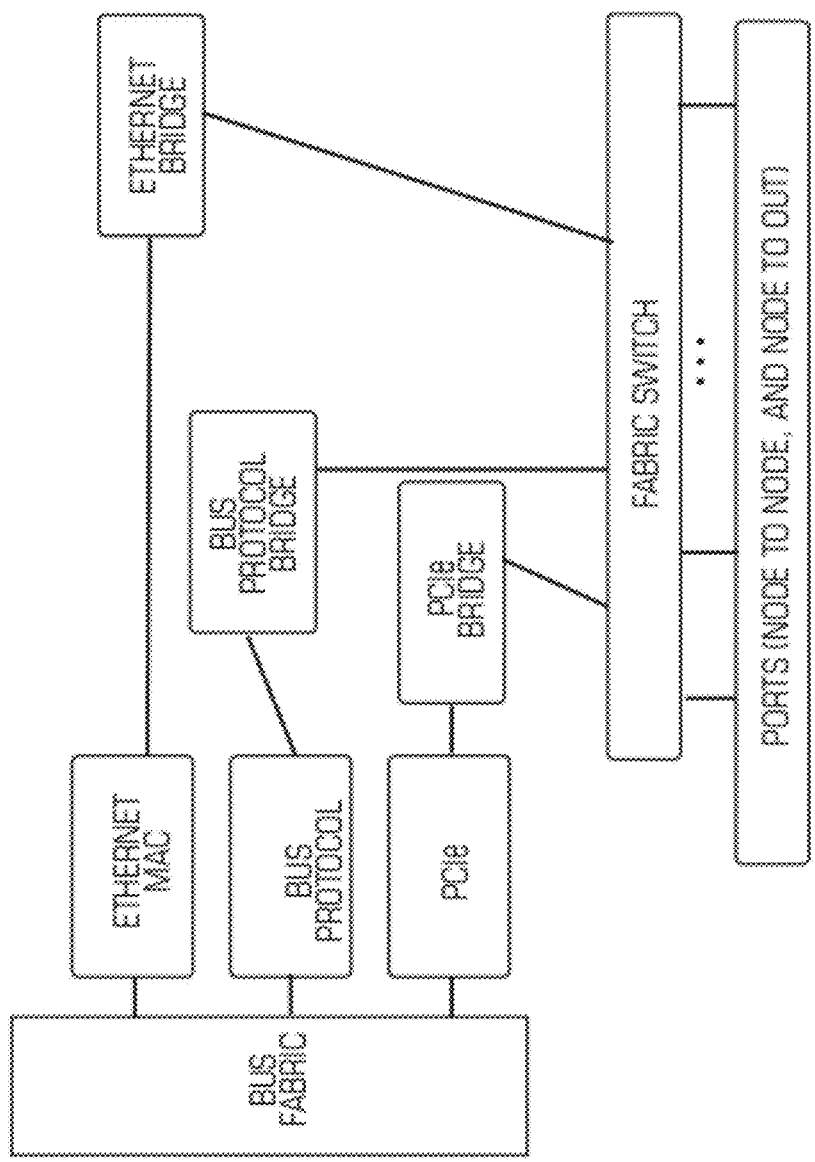
FIG. 18a illustrates a system with multiple protocol bridges using the fabric switch.

FIG. 18*a* illustrates an additional extension that shows that multiple protocol bridges can take advantage of the fact that the fabric switch routes on the routing header, not directly on the underlying packet payload (e.g. a layer 2 Ethernet frame). In this illustration, 3 protocol bridges are shown: Ethernet, PCIe, and a Bus Protocol bridge.

The role of the bus protocol bridge is to take the processor or internal SOC fabric protocol, packetize it, add a Calxeda fabric routing header, and then route it through the Calxeda fabric.

As a tangible example, consider a bus protocol such as AMBA AXI, HyperTransport, or QPI (Quick Path Interconnect) within an SOC.

Consider the following data flow:
A processor on the internal SOC bus fabric issues a memory load (or store) request.
The physical address target for the memory operation has been mapped to a remote node on the fabric.
The bus transaction traverses through the bus protocol bridge:
 The bus transaction is packetized
 The physical address for the memory transaction is mapped to a remote node, that node ID is used when building the routing header.
 A routing frame is built by the bus protocol bridge consisting of a routing header with the remote node ID, and the payload being the packetized bus transaction.
The bus transaction routing frame passes through the Fabric Switch, traverses through the fabric, and is received by the target node's frame switch.
The target node bus protocol bridge unpacks the packetized bus transaction, issues the bus transaction into the target SOC fabric, completes the memory load, and returns the result through the same steps, with the result flowing back to the originating node.

Network Processor Integration with Server Fabric

Figure 19:
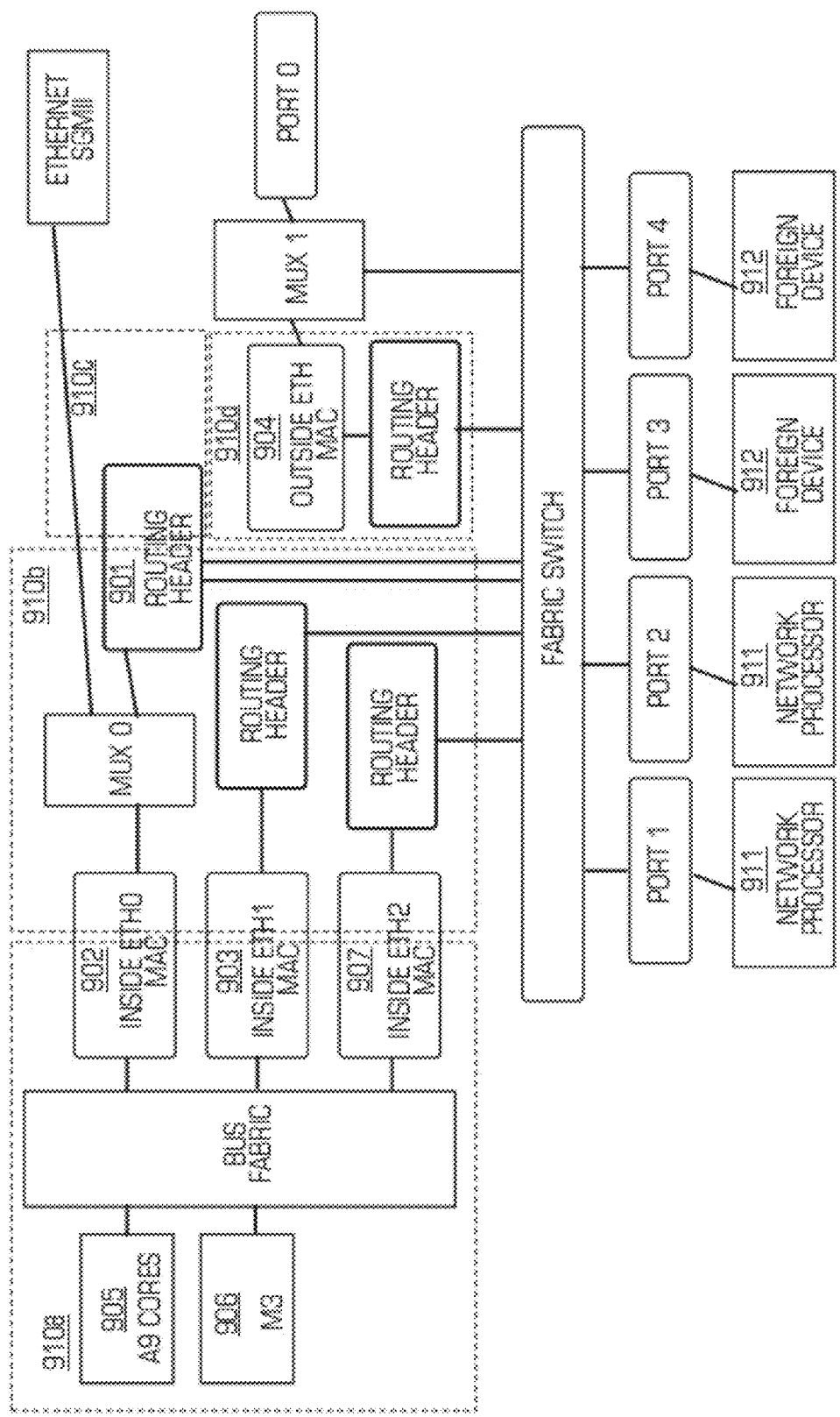
FIG. 19 illustrates integration of the server fabric with a network processor.

FIG. 19 shows an illustration of integrating the server fabric with Network Processors (911). There are several use cases for the integration of the server fabric with Network Processors, including:
 The Network processors can serve as network packet processing accelerators to both the local processors (905), as well as any other processor on the fabric.
 Can be a Network Processor centric design, where the incoming packets from the external Ethernet are targeted to the Network Processors, and the Network Processors and the Control Plane processing can be offloaded to the larger processor cores (905).
 The server fabric can serve as a communication fabric between the network processors.

To enable these novel use cases, the network processors are assigned a MAC address. In the switch architecture shown in FIG. 19, there are not Routing Header Processors attached to Port 1-4. So agents connected directly to Ports 1-4 need to inject packets that have the Fabric Switch Header prepended to payload packet. The Network Processor adds fabric switch integration to their design by:
 Outgoing packets from the Network Processor are tagged with the fabric switch header, which encodes the Destination Node ID from the Destination MAC.
 Incoming packets to the Network Processor from the Fabric Switch have the fabric switch header removed before Ethernet packet processing.

Foreign Device Integration with Server Fabric

FIG. 19 shows an illustration of integrating the server fabric with arbitrary Foreign Devices (912). By Foreign Device, we mean any processor, DSP, GPU, I/O, or communication or processing device that needs an inter-device communication fabric. A typical use case would be a large processing system composed of DSP or GPU processors that need an interconnect fabric between the DSP or GPU processors.

The Fabric Switch routes packets based upon the fabric routing header, and does no packet inspection of the packet payload. The packet payload has no assumptions of being formatted as an Ethernet frame, and is treated completely as an opaque payload.

This allows Foreign Devices (e.g. DSP or GPU processors) to attach to the fabric switch and leverage the scalable, high performance, power optimized communication fabric by:
- Adding a routing frame header contained the destination node ID of the packet to an arbitrary packet payload sending to the frame switch.
- Stripping the routing frame header when receiving a packet from the frame switch.

Load Balancing

When considering a fabric topology such as illustrated in FIG. 5, each of the nodes in the fabric export at least one MAC address and IP address to provide external Ethernet connectivity through the gateway nodes shown in 501a and 501b.

Exposing these fine grained MAC and IP addresses is advantageous for large scale web operations that use hardware load balancers because it provides a flat list of MAC/IP addresses for the load balancers to operate against, with the internal structure of the fabric being invisible to the load balancers.

But, smaller data centers can be potentially over-whelmed with a potentially large number of new MAC/IP addresses that a high-density low-power server can provide. It is advantageous to be able to provide the option for load balancing to insulate external data center infrastructure from having to deal individually with a large number of IP addresses for tiers such as web serving.

Figure 20:
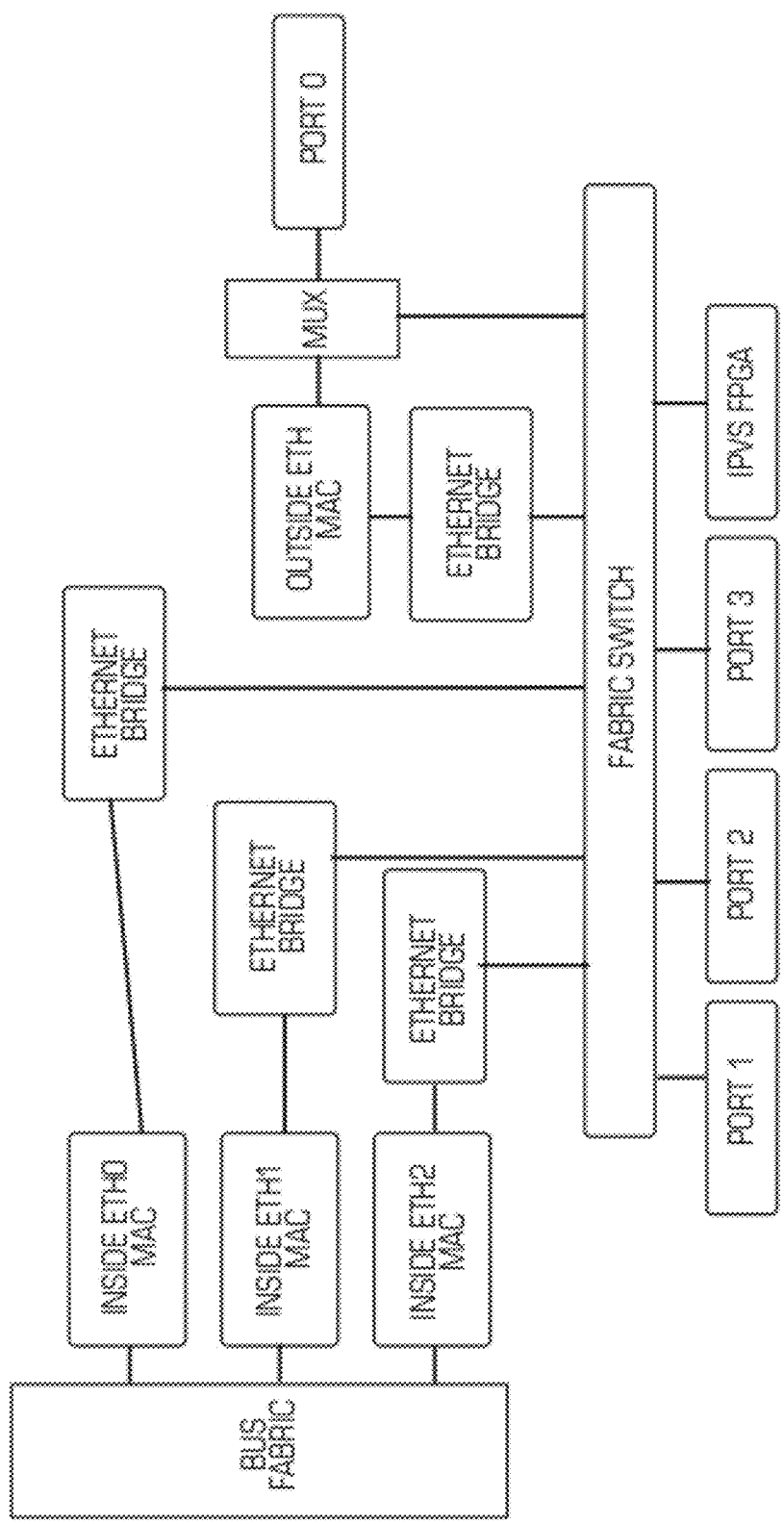
FIG. 20 illustrates the fabric switch and a FPGA that provides services such as IP Virtual Server (IPVS)

Consider FIG. 20 where we have taken one port on the fabric switch and have added a FPGA that provides services such as IP Virtual Server (IPVS). This IP virtualization can be done a range of network levels including Layer 4 (Transport) and Layer 7 (Application). In many cases, it is advantageous for load balancing to be done at layer 7 for data center tiers such as web serving such that a http session state can be maintained locally by a specific web server node. The IPVS FPGA is only attached to the gateway nodes (nodes 501a and 501b in FIG. 5).

In this example, the fabric illustrated in FIG. 5, when augmented with the IPVS FPGAs on the gateway nodes, can export a single IP address per gateway node. The IPVS FPGA then load balances the incoming requests (e.g. HTTP requests) to the nodes within the fabric. With layer 4 load balancing, the IPVS FPGA can be done stateless, and use algorithms including round robin across nodes, or instancing a max number of requests per node before using the next node. With layer 7 load balancing, the IPVS FPGA will need to maintain state such that application sessions can be targeted to specific nodes.

The resulting flow becomes:
- Incoming request (e.g. HTTP request) enters the gateway node (Port 0) in FIG. 20.
- The fabric switch routing tables have been configured to direct the incoming traffic from Port 0 to the IPVS FPGA port on the fabric switch.
- The IPVS FPGA rewrites the routing header to target a specific node within the fabric, and forwards the resulting packet to the target node.
- The target node processes the request, and sends the results normally out the gateway node.

OpenFlow/Software Defined Networking Enabled Fabric

OpenFlow is a communications protocol that gives access to the forwarding plane of a switch or router over the network. OpenFlow allows the path of network packets through the network of switches to be determined by software running on a separate server. This separation of the control from the forwarding allows for more sophisticated traffic management than feasible today using ACLs and routing protocols. OpenFlow is considered an implementation of the general approach of Software Defined Networking.

Figure 21:
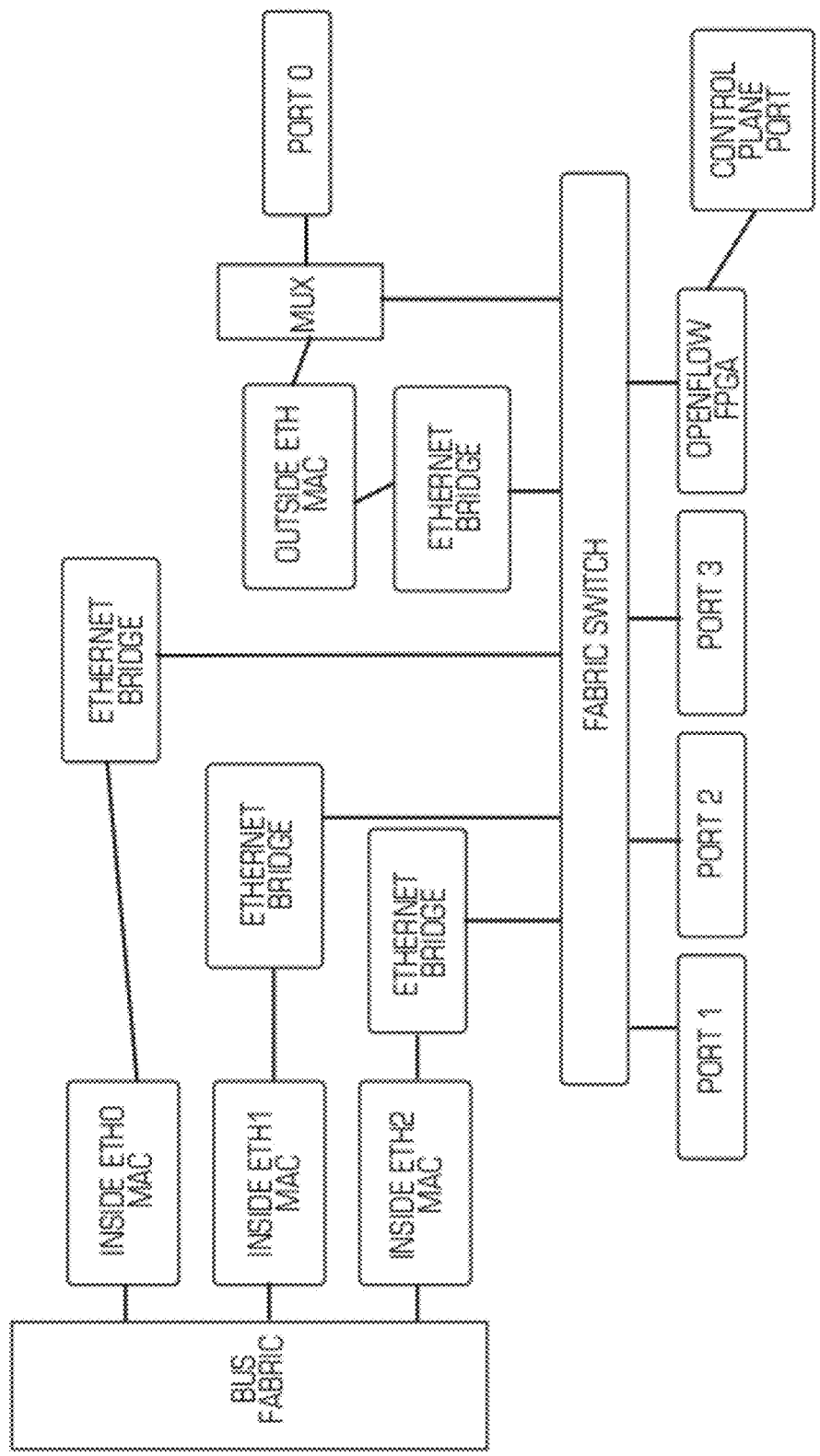
FIG. 21 illustrates a way to build OpenFlow flow processing into the Calxeda fabric.

FIG. 21 shows a way to build OpenFlow (or more generally software defined networking (SDF)) flow processing into the Calxeda fabric. Each of the gateway nodes would instance an OpenFlow enabled FPGA on a port of the gateway node's fabric switch. The OpenFlow FPGA needs an out-of-band path to the control plane processor, this can be done by a separate networking port on the OpenFlow FPGA, or can be done by simply claiming another port off the fabric switch to talk to the control plane processor.

The resulting flow becomes:
- Incoming request enters the gateway node (Port 0) in FIG. 20.
- The fabric switch routing tables have been configured to direct the incoming traffic from Port 0 to the OpenFlow/SDF FPGA port on the fabric switch.
- The OpenFlow/SDF FPGA implements standard OpenFlow processing, including optionally contacting the control plane processor if necessary. The OpenFlow/SDF FPGA rewrites the routing header to target a specific node within the fabric (by MAC address), and forwards the resulting packet to the target node.
- The target node processes the request, and sends the results back to the OpenFlow FPGA where it implements any outgoing flow processing.

Integration of Power Optimized Fabric to Standard Processors Via PCIe

Figure 22:
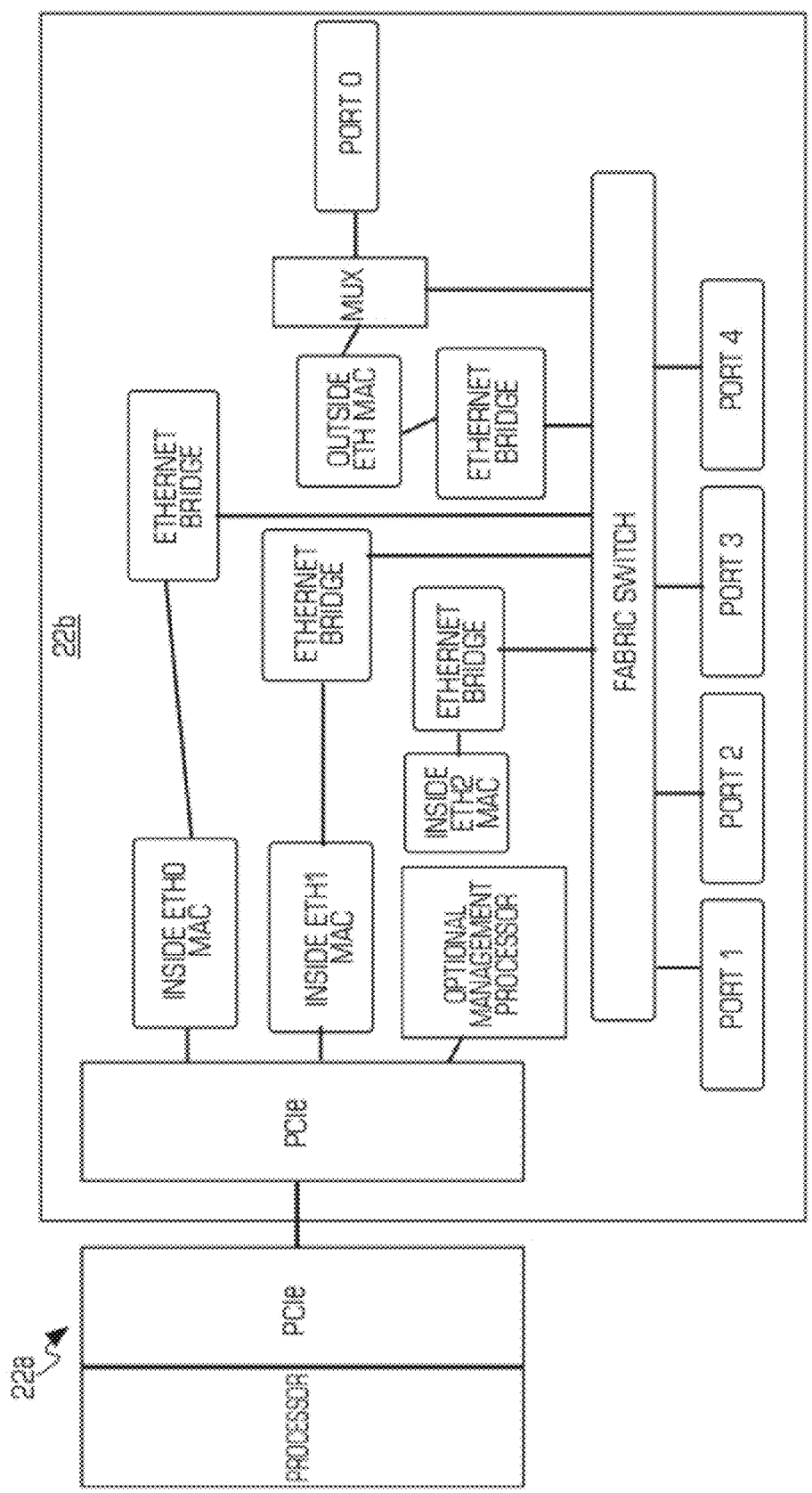
FIG. 22 illustrates one example of an integration of the power optimized fabric switch to an existing processor via PCIe.

The power optimized server fabric depicted in FIG. 5 and described previously provide compelling advantages to existing standard processors and can be integrated as an integrated chip solution with existing processors. Standard desktop and server processors often support PCIe interfaces either directly, or via an integrated chipset. FIG. 22 illustrates one example of an integration of the power optimized fabric switch to an existing processor via PCIe. Item 22a depicts a standard processor that supports one or more PCIe interfaces, either directly, or via an integrated chipset. Item 22b depicts the disclosed fabric switch with integrated Ethernet MAC controllers to which a PCIe interface has been integrated. Item 22b may typically be integrated together utilizing a FPGA or ASIC implementation of the PCIe integrated fabric switch.

In this disclosure, the nodes depicted in FIG. 5 can be a heterogenous combination of power-optimized server SOCs with the integrated fabric switch, as well as this disclosed integration of PCIe connected standard processor to a PCIe interfaced module containing the Ethernet MACs and the fabric switch.

Integration of Power Optimized Fabric to Standard Processors Via Ethernet

Figure 23:
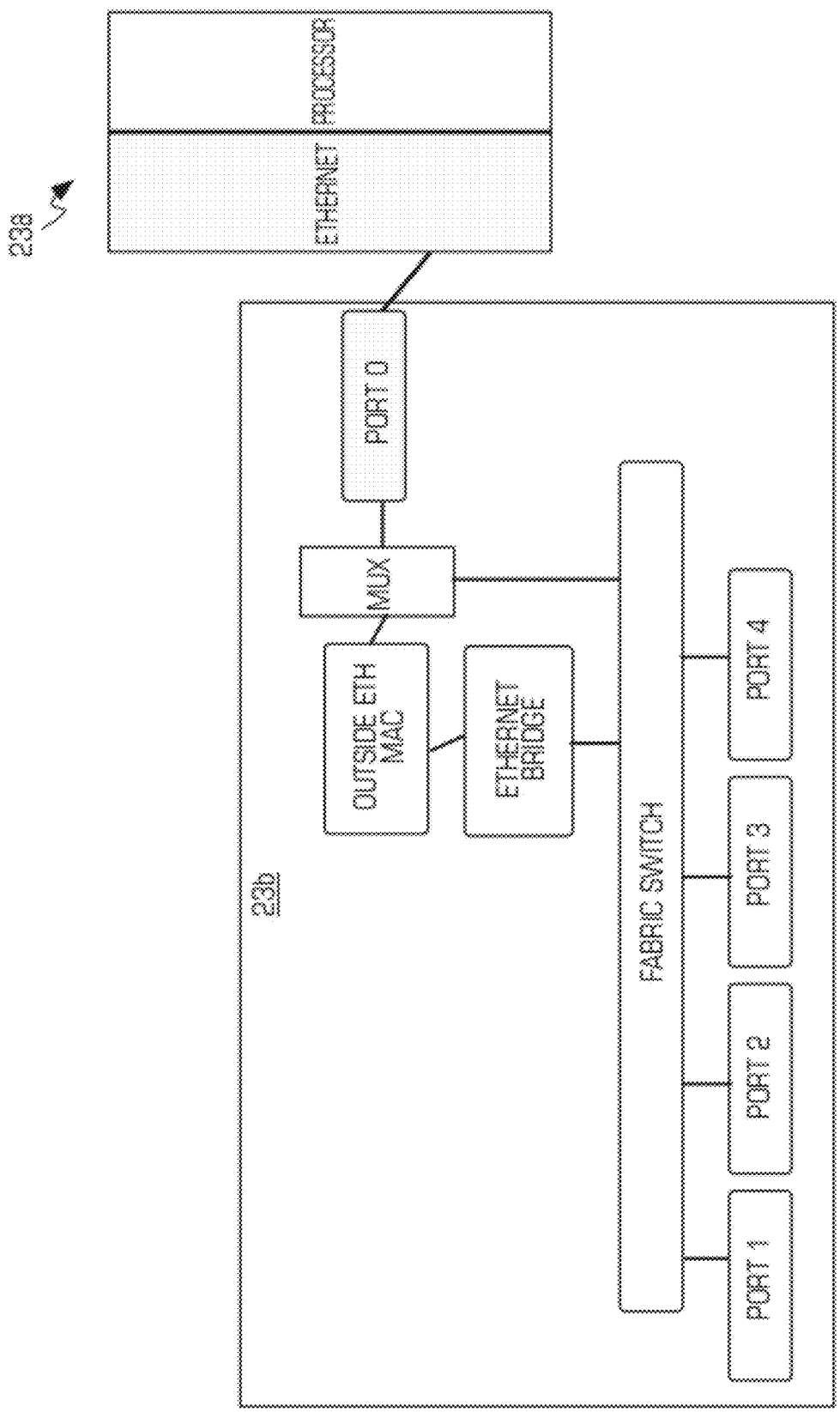
FIG. 23 illustrates one example of an integration of the power optimized fabric switch to an existing processor via Ethernet.

The power optimized server fabric depicted in FIG. 5 and described previously provide compelling advantages to existing standard processors and can be integrated as an integrated chip solution with existing processors. Standard desktop and server processors often support Ethernet interfaces via an integrated chip, or potentially provided within an SOC. FIG. 23 illustrates one example of an integration of the power optimized fabric switch to an existing processor via Ethernet. Item 23a depicts a standard processor that supports an Ethernet interface, either by means of an SOC, or via an integrated chip. Item 23b depicts the disclosed fabric switch without the integrated inside Ethernet MAC controllers. Item 23b may typically be integrated together utilizing a FPGA or ASIC implementation of the integrated fabric switch.

In this disclosure, the nodes depicted in FIG. 5 can be a heterogenous combination of power-optimized server SOCs with the integrated fabric switch, as well as this disclosed integration of Ethernet connected standard processor to the integrated fabric switch implemented in an FPGA or ASIC.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A computing device comprising:
a plurality of server nodes interconnected by a plurality of fabric links to form a server fabric, wherein the plurality of server nodes are grouped on a server board; and
one or more Ethernet escapes from the server fabric, wherein the one or more Ethernet escapes are configured to connect the server fabric to one or more ports external to the server fabric, and wherein the one or more Ethernet escapes are further configured to be pulled at any node in the plurality of server nodes to conserve bandwidth and power;
wherein a speed of each of the plurality of fabric links is configured to be dynamically adjustable based on a utilization of a particular fabric link to optimize power; and
wherein each server node that is grouped on the server board includes:
a processor;
a memory;
an input/output circuit; and
an internal fabric switch, wherein the internal fabric switch is located on the server node and is configured to connect the server node to the server fabric and to switch information in the server fabric.

2. The computing device of claim 1, further comprising an aggregate of a set of server boards, wherein each of the server boards includes one or more of the plurality of server nodes, and wherein the set of server boards are interconnected to form a server.

3. The computing device of claim 1, wherein the internal fabric switches are configured to switch Ethernet layer 2 packets appended with routing headers.

4. The computing device of claim 1, wherein a speed of each of the plurality of fabric links is set to optimize power.

5. The computing device of claim 1, wherein the speed is dynamically adjustable based on an instantaneous utilization of a particular fabric link or an average utilization of the particular fabric link.

6. The computing device of claim 2, wherein one or more of the plurality of fabric links and the one or more Ethernet escapes each comprise a peripheral component interconnect express (PCIe) connector that is connected to the set of server boards.

7. The computing device of claim 1, further comprising a passive backplane that comprises a point-to-point server interconnect fabric.

8. The computing device of claim 1, wherein the server fabric has a topology of a tree, and wherein the one or more Ethernet escapes are disposed at each level of the tree.

9. The computing device of claim 1, wherein each of the one or more Ethernet escapes is configured to be enabled or disabled in accordance with a bandwidth that is configured to match with optimized power usage.

10. The computing device of claim 1, wherein data between the plurality of server nodes is configured to route in the server fabric but not the one or more Ethernet escapes.

11. The computing device of claim 3, wherein each of the plurality of server nodes is configured to have computational components thereon turned off in response to power reducing.

12. The computing device of claim 1, further comprising a plurality of server boards that are configured to form a rack or a backplane.

13. The computing device of claim 12, further comprising a plurality of shelves that are configured to compose a rack.

14. A computing device, comprising:
a storage device of a form factor; and
a server node of the same form factor as the storage device, wherein the server node is connected to other server nodes by a plurality of fabric links, wherein a speed of each of the plurality of fabric links is configured to dynamically adjustable based on an utilization of a particular fabric link to optimize power, and wherein the server node includes:
a processor;
a memory;
an input/output circuit;
an internal fabric switch, wherein the internal fabric switch is located on the server node and is configured to connect the server node to a network and to switch information in the network; and
one or more serial advanced technology attachment (SATA) interfaces configured to connect to the storage device;
wherein the server node is configured to control the storage device.

15. The computing device of claim 14, further comprising an array of storage devices and an array of server nodes, wherein the array of server nodes are interconnected to each other.

16. The computing device of claim 14, wherein the server node is disposed within the storage device.

17. The computing device of claim 14, wherein the server node is connected to the storage device, and wherein the storage device is a local storage for the server node.

18. The computing device of claim 14, further comprising a plurality of storage devices, wherein each of the plurality of storage devices is connected to one of the one or more SATA interfaces, and wherein the server node is further configured to control the plurality of storage devices.

19. The computing device of claim 14, further comprising a plurality of server nodes and a plurality of storage devices, wherein the plurality of server nodes are interconnected to form a server fabric, and wherein the plurality of server nodes are configured to control the plurality of storage devices.

20. The computing device of claim 14, further comprising one or more Ethernet escapes and a link, wherein the one or more Ethernet escapes and the link each comprise a peripheral component interconnect express (PCIe) connector.

21. A method for producing a high density computing system, the method comprising:
encapsulating a server node into a form factor of a disk drive and positioning the server node at an angled alignment to facilitate cooling, wherein the server node is connected to other server nodes by a plurality of fabric links, wherein a speed of each of the plurality of fabric links is configured to be dynamically adjustable based on an utilization of a particular fabric link to optimize power, and wherein the server node includes:
a processor;
a memory;
an input/output circuit;
an internal fabric switch, wherein the internal fabric switch is located on the server node and is configured to connect the server node to a network and to switch information in the network; and
one or more serial advanced technology attachment (SATA) interfaces connected to the disk drive; and
controlling, by the server node, the disk drive.

22. The method of claim 21, further comprising creating at least one internal switching pathway on a backplane of the disk drive.

23. A method for producing a high density computing system, the method comprising:
integrating a server node into a disk drive of a standard form factor and positioning the server node at an angled alignment relative to the disk drive to facilitate cooling, wherein the server node is connected to other server nodes by a plurality of fabric links, wherein a speed of each of the plurality of fabric links is configured to be dynamically adjustable based on an utilization of a particular fabric link to optimize power, and
wherein the server node includes:
a processor;
a memory;
an input/output circuit;
an internal fabric switch, wherein the internal fabric switch is located on the server node and is configured to connect the server node to a network and to switch information in the network; and
one or more serial advanced technology attachment (SATA) interfaces connected to the disk drive; and
controlling, by the server node, the disk drive.

24. The computing device of claim 1, wherein each server node of the plurality of server nodes is positioned at an angled alignment relative to the server board.

25. The computing device of claim 14, further comprising a server board, wherein each server node is positioned on the server board at an angled alignment relative to the server board.

* * * * *